(12) United States Patent
Schad et al.

(10) Patent No.: US 8,221,670 B2
(45) Date of Patent: Jul. 17, 2012

(54) MOLD MOTION CONTROL SYSTEM FOR AN INJECTION MOLDING MACHINE

(75) Inventors: Robert D. Schad, Toronto (CA); Carsten Link, Burlington (CA)

(73) Assignee: Athena Automation Ltd., Vaughan (CA)

( * ) Notice: Subject to any disclaimer, the term of this patent is extended or adjusted under 35 U.S.C. 154(b) by 0 days.

(21) Appl. No.: 13/078,608

(22) Filed: Apr. 1, 2011

(65) Prior Publication Data
US 2011/0233823 A1    Sep. 29, 2011

Related U.S. Application Data

(63) Continuation of application No. PCT/CA2009/001399, filed on Oct. 2, 2009.

(60) Provisional application No. 61/102,633, filed on Oct. 3, 2008.

(51) Int. Cl.
*B29C 45/64* (2006.01)

(52) U.S. Cl. ............... 264/328.1; 425/150; 425/589; 425/595

(58) Field of Classification Search ......... 264/328.1; 425/150, 589, 590, 595
See application file for complete search history.

(56) References Cited

U.S. PATENT DOCUMENTS

| | | | |
|---|---|---|---|
| 2,976,569 A | 3/1961 | Quere et al. | |
| 3,716,323 A | 2/1973 | Classen | |
| 4,017,236 A | 4/1977 | Penkman et al. | |
| 4,230,442 A | 10/1980 | Rees et al. | |
| 5,320,517 A | 6/1994 | Hirata et al. | |
| 5,620,723 A | 4/1997 | Glaesener et al. | |
| 5,753,153 A | 5/1998 | Choi | |
| 6,805,827 B2 | 10/2004 | Kami et al. | |
| 6,878,317 B2 | 4/2005 | Kubota | |
| 6,945,765 B2 | 9/2005 | Roetzel | |
| 7,404,920 B2 | 7/2008 | Nogueira | |
| 2007/0085238 A1* | 4/2007 | Manabe et al. | 264/299 |
| 2008/0187618 A1 | 8/2008 | Schad et al. | |
| 2008/0187771 A1 | 8/2008 | Schad et al. | |

FOREIGN PATENT DOCUMENTS

| | | |
|---|---|---|
| CA | 2177950 | 12/1996 |
| GB | 1340200 | 12/1973 |
| JP | 2052707 | 2/1990 |
| JP | 3092311 | 4/1991 |
| JP | 2005335075 | 12/2005 |

\* cited by examiner

*Primary Examiner* — Jill Heitbrink
(74) *Attorney, Agent, or Firm* — Bereskin & Parr LLP/S.E.N.C.R.L.,s.r.l.

(57) ABSTRACT

A method for injection molding comprises pre-positioning a clamp piston within a cylinder housing to a datum position axially intermediate a clamping position and an unclamped position, the clamp piston affixed to a tie bar, the clamp piston and cylinder housing cooperating to provide a clamp chamber and an unclamp chamber in a clamp cylinder housing on axially opposite sides of the clamp piston for urging the clamp piston towards the clamping and unclamped positions, respectively, when pressurized. Pre-positioning the clamp piston can include leaving a positioning gap between portions of a mold before releasably locking a tie bar to one of the moving or stationary platens, and then advancing the moving platen to substantially close the positioning gap after the releasable locking has been completed. Pre-positioning the clamp piston can include moving a stop member to an advanced position in the cylinder housing, and urging the clamp piston to bear against the stop member before the releasable locking step has been completed.

19 Claims, 14 Drawing Sheets

MOLD MOTION CONTROL SYSTEM FOR AN INJECTION MOLDING MACHINE

This application is a continuation of PCT Patent Application No. PCT/CA2009/001399, filed on Oct. 2, 2009, which claims the benefit of priority from U.S. Provisional Patent Application No. 61/102,633, filed on Oct. 3, 2008, each of which is hereby incorporated herein by reference.

FIELD

The specification relates to injection molding machines, elements thereof, and methods and apparatuses for controlling motion of molds in an injection molding machine.

BACKGROUND

U.S. Pat. No. 2,976,569 (Quere et al.) discloses a material forming apparatus comprising mould sections adapted to be slidably displaced with respect to each other, a hydraulic pressure mechanism including a plurality of pressure cylinders, said pressure mechanism being adapted to draw the mould sections together under high pressure, releasable coupling rods and intermediate coupling means adapted to effect a selective coupling between the pressure cylinders and one of the mould sections, a driving mechanism working independently of the pressure cylinders and adapted to drive said rods and intermediate coupling means so that a selective coupling can be effected in unloaded condition of the coupling means, said coupling means including a plurality of claws on each coupling rod, and coupling sleeves carried by the other of said mould sections and internally including claws for engaging the first said claws, the coupling sleeves and the coupling rods being adapted for rotation with respect to each other by means of said driving mechanism, each pressure cylinder of the pressure mechanism being arranged adjacent the associated coupling means which are rotatable in the driving means.

U.S. Pat. No. 5,620,723 (Glaesener et al.) discloses an injection molding machine that includes a stationary platen including at least one stationary mold half and a first movable platen. The first movable platen is movable relative the stationary platen and has a second mold half adapted to engage the stationary mold half to form a first mold. A second movable platen may also be provided which is movable toward the stationary platen and includes a third mold half adapted to engage a fourth mold half included with one of the stationary platen and the first movable platen. The third and fourth mold halves form a second mold. Each of the first and second molds having a hot runner leading thereto and an injection unit is provided for delivering melt to the hot runners of the first and second molds. The machine further includes tie bars extending between and connecting the stationary platen and the movable platens. At least one of the first and, if used, the second movable platen and stationary platen includes a mechanism for securing at least one of the tie bars. The mechanism for securing comprises an engagement mechanism for placing the mechanism for securing into and out of locking engagement with at least one of the tie bars such that when the engagement mechanism is out of locking engagement with the at least one tie bar, the mechanism for securing and the at least one tie bar are relatively movable U.S. Pat. No. 5,753,153 (Choi) discloses a system and process for controlling mold activity of a molding machine that includes a clamping device for positioning a movable mold platen on a carrier device and relative another platen, for forcefully engaging the movable mold platen with the another platen and on the carrier device, for sustaining forceful engagement of the movable mold platen with the another platen and the carrier device, and for breaking the movable platen from the another platen and the carrying device. The movable mold platen includes a movable mold half and the another platen includes another mold half. The system also includes a manner for determining an adjustable starting position of the clamping device and movable mold platen. A manner for adjusting the adjustable starting position for achieving greater accuracy of the adjustable starting position for the clamping device and the movable platen is provided. The manner for adjusting includes a mechanism for actuating the clamping device. A device for monitoring and controlling the position of the clamping device and movable platen is provided as well as a mechanism for sustaining the clamp-up force at a prescribed level.

U.S. Pat. No. 7,404,920 (Nogueira) discloses a molding-system clamp assembly of a molding system, which includes a clamp piston, and a clamp ram, the clamp ram and the clamp piston each including inter-meshable structures to selectively inter-mesh the clamp piston to the clamp ram. In the unmeshed position the clamp piston and the clamp ram do not inter-mesh relative to each other. The assembly includes inter-abuttable structures to selectively inter-abut the clamp piston relative to the clams ram, the inter-abuttable structures having an interposing body abuttable against the clamp ram and the clamp piston, the inter-abuttable structures to abut with each other so that the clamp piston makes contact with the interposing body. The inter-abuttable structures are configured to transfer a mold-break force so that the mold-break force is applied from the clamp piston against the interposing body, and in response the mold-break force is transferred from the clamp piston through the interposing body and to the clamp ram, and once mold break has occurred, the clamp piston is deactivated so that the mold may be opened.

U.S. Published Pat. Appn. 2008/0187771 (Schad et al.) discloses (i) a clamp of a molding system, (ii) a molding system having a clamp, (iii) a method of a clamp of a molding system, (iv) a molded article manufactured by usage of a clamp of a molding system, (v) a molded article manufactured by usage of a molding system including a clamp, and (vi) a molded article manufactured by usage of a method of a clamp of a molding system. A disclosed embodiment of a clamp assembly includes a pressure chamber for moving a piston to exert a clamping force on a mold, and a spring acting on a rest plate in a direction opposite the clamping force to position the piston in a home position when the force exerted by pressurized fluid in the clamping chamber is less than the spring force.

SUMMARY

The following summary is intended to introduce the reader to various aspects of the applicant's teaching, but not to define any invention. In general, disclosed herein are one or more methods or apparatuses related to injection molding, and to positioning, locking, and clamping molds in injection molding machines.

According to one aspect, a method for injection molding, comprises a) energizing a traverse actuator in a first direction to advance a moving platen towards a closed position relative to a stationary platen, the moving and stationary platens carrying respective portions of a mold; b) locking a first one of the moving and stationary platens to a tie bar extending from the other, second one, of the moving and stationary platens; c) pre-positioning a clamp piston within a cylinder housing to a datum position axially intermediate a clamping position and an unclamped position, the clamp piston affixed to the tie bar, the clamp piston and cylinder housing cooperating to provide a clamp chamber and an unclamp chamber in the cylinder housing on axially opposite sides of the piston for urging the clamp piston towards the clamping and unclamped positions, respectively, when pressurized; d) after steps c) and b), pressurizing the clamp chamber so as to exert a clamping force urging the portions of the mold together; e) after step d), injecting melt into the mold portions; f) after step e), relieving pressure in the clamp chamber; g) after step f), pressurizing the unclamp chamber to move the piston to the unclamped position; h) after step f), unlocking the first one of the moving and stationary platens from the tie bar; and i) after step h), energizing the traverse actuator to retract the moving platen to an open position spaced away from the stationary platen.

The piston can be moved to a shutter position before step b), and step c) can comprise moving the piston axially away from the shutter position after step b). Step h) can be performed after step g), and step g) can comprise applying a mold break force for urging the mold portions apart.

Step a) can comprise leaving a positioning gap between the portions of the mold before step b), and step c) can comprise further advancing the moving platen to substantially close the positioning gap after step b). The method can further include energizing the traverse actuator in the first direction while further advancing the moving platen after step b).

The clamp chamber can be filled with oil while further advancing the moving platen after step b). Filling the clamp chamber can include releasing fluid from an accumulator. Filling the clamp chamber can include pressurizing a first prefill volume in communication with the clamp chamber to displace fluid towards the clamp chamber.

The first prefill volume can be provided on a first axial side of a prefill piston slidably mounted in a prefill cylinder housing, and the method can further include providing a second prefill volume on a second axial side of the prefill piston. Pressurizing the second prefill volume can urge the prefill piston to an advanced position, and displace fluid from the first prefill volume towards the clamp chamber. The method can include opening a prefill valve provided between the first prefill volume and the clamp chamber. The prefill valve can include a valve piston within a valve cylinder housing, and a valve stopper mounted to the valve piston, the valve piston and valve cylinder housing cooperating to provide a valve open chamber and a valve closed chamber in the cylinder housing on axially opposite sides of the valve piston. Opening the prefill valve can include pressurizing the valve open chamber and venting the valve closed chamber to urge the valve piston and valve stopper to an advanced position, wherein when the valve stopper is in the advanced position, the valve is open. The method can include closing the prefill valve prior to step d). The method can include opening the prefill valve after step f).

In some examples of the method, step c) can include, prior to step b), moving a stop member to an advanced position in the cylinder housing, and urging the clamp piston to bear against the stop member. Step c) can include pressurizing the unclamp chamber. Step c) can include venting the clamp chamber to tank. Step a) can include leaving substantially no gap between the portions of the mold before step b). Step c) can include pressurizing a positioning chamber in communication with the stop member for urging the stop member to the advanced position. The stop member can be movably disposed between the clamp chamber and the piston, and moving the stop member from a retracted position to the advanced position can reduce the volume of the clamp chamber.

According to another aspect, a method for injection molding is provided. The method comprises (a) energizing a traverse actuator in a first direction to advance a moving platen towards a closed position relative to a stationary platen, the moving and stationary platens carrying respective portions of a mold; (b) locking the moving platen to a tie bar extending from the stationary platen; (c) pre-positioning a clamp piston within a cylinder housing to a datum position axially intermediate a clamping position and an unclamped position, the clamp piston affixed to the tie bar, the clamp piston and cylinder housing cooperating to provide a clamp chamber and an unclamp chamber in the cylinder housing on axially opposite sides of the piston for urging the clamp piston towards the clamping and unclamped positions, respectively, when pressurized; (d) after steps c) and b), pressurizing the clamp chamber so as to exert a clamping force urging the halves of the mold together; (e) after step d), injecting melt into the mold portions; (f) after step e), relieving pressure in the clamp chamber and pressurizing the unclamp chamber so as to exert a mold break force urging the mold portions apart and moving the piston to the unclamped position; (g) after step f), unlocking the moving platen from the tie bar; and (h) after step g), energizing the traverse actuator to retract the moving platen to an open position spaced away from the stationary platen.

Step a) can comprise leaving a positioning gap between the portions of the mold before step b), and step c) can comprise further advancing the moving platen to substantially close the positioning gap after step b). The method can further comprise energizing the traverse actuator in the first direction while further advancing the moving platen after step b).

The clamp chamber may be filled with oil while further advancing the moving platen after step b). Filling the clamp chamber may comprise releasing fluid from an accumulator. Alternately, filling the clamp chamber may comprise pressurizing a first prefill volume in communication with the clamp chamber to urge fluid from the first prefill volume towards the clamp chamber.

The first prefill volume may be provided by a prefill piston within a prefill cylinder housing. The prefill piston and prefill cylinder housing may cooperate to provide a second prefill volume on a second axial side of the prefill piston. The first prefill volume may be on a first axial side of the prefill piston. Pressurizing the first prefill volume may comprise pressurizing the second prefill volume to urge the prefill piston to an advanced position.

The method may further comprise opening a prefill valve provided between the first prefill volume and the clamp chamber. The prefill valve may comprise a valve piston within a valve cylinder housing, and a valve stopper mounted to the valve piston. The valve piston and valve cylinder housing may cooperate to provide a valve open chamber and a valve closed chamber in the cylinder housing on axially opposite sides of the valve piston.

Opening the prefill valve may comprise pressurizing the valve open chamber and venting the valve closed chamber to urge the valve piston and valve stopper to an advanced position. When the valve stopper is in the advanced position, the valve may be open.

The method may further comprise closing the prefill valve prior to step d). The prefill valve may be opened after relieving the pressure in the clamp chamber.

Step c) may comprise, prior to step b), moving a stop member to an advanced position in the cylinder housing, and urging the clamp piston to bear against the stop member. Step c) may further comprise pressurizing the unclamp chamber, and venting the clamp chamber to tank. Step a) may comprise leaving substantially no gap between the portions of the mold before step b). Step c) may comprise pressurizing a positioning chamber in communication with the stop member for urging the stop member to the advanced position. The stop member may be movably disposed between the clamp chamber and the piston, and wherein moving the stop member from a retracted position to the advanced position reduces the volume of the clamp chamber. Step b) may comprise rotating a lock nut to engage teeth provided on the tie bar.

According to another aspect, a clamping mechanism for an injection molding machine is provided. The clamping mechanism comprises: a) a cylinder housing affixed to a platen; b) a piston affixed to a tie bar, the piston slidable within the cylinder housing among a clamped, an unclamped, and a datum position, the clamped, unclamped, and datum positions being axially spaced apart from each other; c) a clamp chamber in the housing on a first side of the piston for urging the piston to the clamped position when pressurized; d) an unclamp chamber on a second side of the piston axially opposite the first side for urging the piston towards the unclamped position when pressurized; and e) a stop member movable relative to the piston and the cylinder housing and moveable between an advanced position and a retracted position, the stop member when in the advanced position providing a mechanical stop for the piston when the piston is moved to the datum position.

The datum position may be axially intermediate the clamped position and the unclamped position.

The stop member may inter-engage with the piston and the cylinder housing when the piston is in the datum position and the positioning member is retained in the advanced position. The stop member may be inside the cylinder housing at least when in the advanced position. The stop member may be disposed entirely within the cylinder housing when in or moving between the advanced and retracted positions. The stop member may be coupled to the piston, and axially displaceable relative to the piston between the advanced and retracted positions. The direction of piston travel when moving from the unclamped to clamped position may be opposite to the direction of travel of the stop member when moving from the retracted to advanced position.

The clamping mechanism may further comprise a pushing member for moving the stop member from the retracted to the advanced position. The pushing member may comprise a positioning chamber for holding pressurized fluid against the stop member.

The cylinder housing may have axially spaced apart front and rear cylinder walls. The piston may have a maximum piston stroke length defined by travel between the front and rear cylinder walls. Axial movement of the tie bar relative to the cylinder housing may be less than or equal to the maximum piston stroke length.

According to another aspect, a clamping mechanism for an injection molding machine is provided. The clamping mechanism comprises: a) a cylinder housing affixed to a platen; b) a piston affixed to a tie bar, the piston slidable within the cylinder housing among a clamped, an unclamped, and a datum position, the clamped, unclamped, and datum positions being axially spaced apart from each other; c) a clamp chamber in the housing on a first side of the piston for urging the piston to the clamped position when pressurized; d) an unclamp chamber on a second side of the piston axially opposite the first side for urging the piston towards the unclamped position when pressurized; and e) a prefill fluid source in communication with the clamp chamber for filling the clamp chamber before applying the mold clamp force (e.g., in some examples, for filling the clamp chamber when the piston is moved from the unclamped position to the datum position).

The prefill fluid source may comprise an accumulator that holds a volume of pressurized fluid for delivery towards the clamp chamber. Alternately or additionally, the prefill fluid source may comprise a prefill piston within a prefill cylinder housing. The prefill piston and prefill cylinder housing may cooperate to provide a first prefill volume on a first axial side of the prefill piston, and a second prefill volume is on a second axial side of the prefill piston. When the second prefill volume is pressurized, the prefill piston may be urged towards an advanced position to urge fluid from the first prefill volume into the clamp chamber.

The clamping mechanism may further comprise a prefill valve provided between the prefill fluid source and the clamp chamber. The prefill valve may comprise a valve piston within a valve cylinder housing, and a valve stopper mounted to the valve piston. The valve piston and valve cylinder housing may cooperate to provide a valve open chamber and a valve closed chamber in the cylinder housing on axially opposite sides of the valve piston. When the valve closed chamber is pressurized and the valve open chamber is vented, the valve piston and valve stopper may be urged to an advanced position. When the valve stopper is in the advanced position, the valve may be open.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1A:
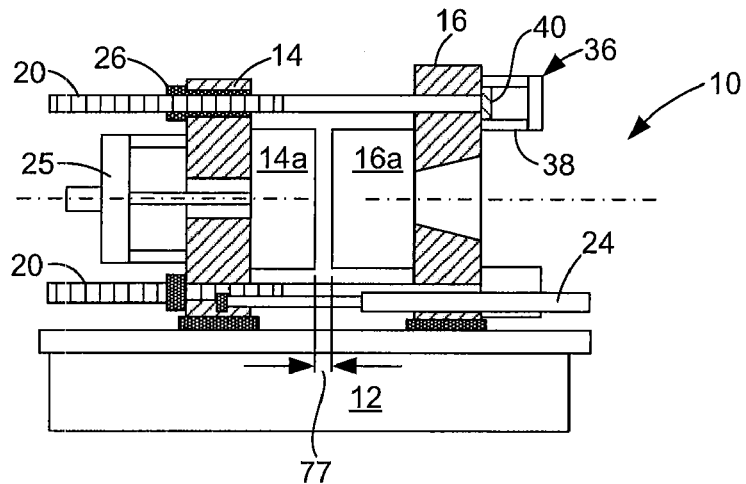
FIG. 1a is a schematic elevation view of a portion of an injection molding machine showing mold halves spaced apart by a positioning gap.

Referring first to FIG. 1a, an injection molding machine 10 is shown having a base 12 upon which first and second platens 14, 16 are mounted. In the example illustrated, the first platen 14 can slide in an axial direction along the base 12, towards and away from the second platen 16 which is stationary in the example illustrated. A traverse actuator 24 can be provided to facilitate moving the moving platen 14 between open and closed positions relative to the stationary platen 16. The platens 14, 16 support respective mold portions 14a, 16a (also referred to as mold halves 14a, 16a). Tie bars 20 extend axially between the platens for clamping the platens together during operation of the machine. A locking device 26 is, in the example illustrated, affixed to the moving platen 14 for releasably locking the moving platen 14 to a respective one of the tie bars 20. Clamping mechanisms 36 can be provided for exerting a clamping force across the mold halves 14a, 16a during an injection cycle. In the example illustrated, the clamping mechanisms 36 include a cylinder housing 38 affixed to the stationary platen 16, and a piston 40 affixed to a respective tie bar and slidable within the cylinder housing 38.

In some examples, one or more (or all) of the tie bars can be anchored in the moving platen, extending from the moving platen towards the stationary platen. The corresponding locking devices can be fixed to the stationary platen, and the corresponding clamping mechanisms can have housings affixed to the moving platen. The teaching disclosed herein can be applied to machines having either (or a mixture) of tie bar configurations (i.e. tie bars anchored in the moving platen or in the stationary platen).

In use of the apparatus 10, the traverse actuator 24 can be energized to advance the moving platen 14 towards a closed position relative to the stationary platen 16. The clamp piston 40 can be moved to a known or pre-established "shutter" position (or lock-up position) in which the position of the piston 40 is mechanically referenced relative to the housing 38. For example, the piston 40 can be moved to a fully unclamped position as shown in FIG. 1a, in which further axial movement away from the clamped position is mechanically inhibited (e.g. piston bottomed out within the housing 38 in the unclamped direction). With the piston 40 in the known shutter position, the axial position of the tie bar is precisely known relative to a machine coordinate system. This can facilitate moving the locking device 26 to the locked position to lock the moving platen 14 to a respective one of the tie bars 20. For example, the tie bar 20 may have tie bar teeth spaced apart axially by first circumferential valleys, and the lock nut can have lock nut teeth spaced apart axially by second circumferential valleys. With the piston 40 in the shutter position, the moving platen 14 can be axially moved relative to the machine coordinate system to a position in which the lock nut teeth are axially aligned with, and can be rotated into, the first circumferential valleys between the tie bar teeth.

Figure 1B:
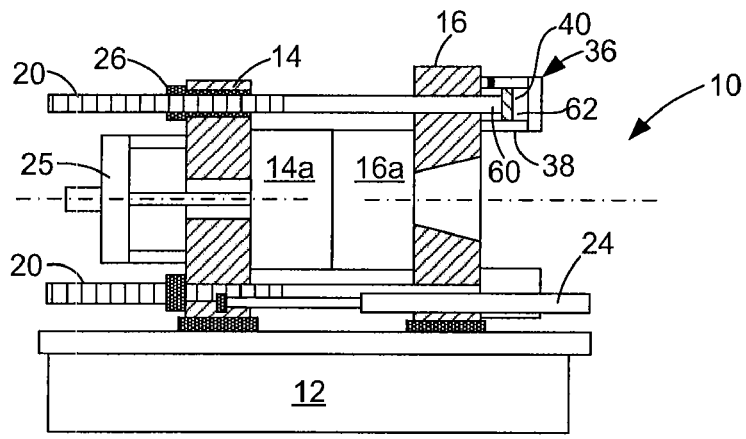
FIG. 1b shows the machine of FIG. 1a with the positioning gap closed.

Prior to pressurizing the clamp chamber 60 of the clamping mechanism 36, the clamp piston 40 can be pre-positioned within the cylinder housing 38 to a datum position (or pre-clamp position) that is axially intermediate the clamping position and the unclamped position (FIG. 1b). In the example illustrated, the intermediate datum position is axially offset from the shutter position in a direction towards the clamped position (towards the right in FIG. 1b). In some examples, the shutter position (lock-up position) and the intermediate datum position (pre-clamp position) can coincide, i.e. can be defined by the same axial position of the piston 40 relative to the housing 38.

Figure 1C:
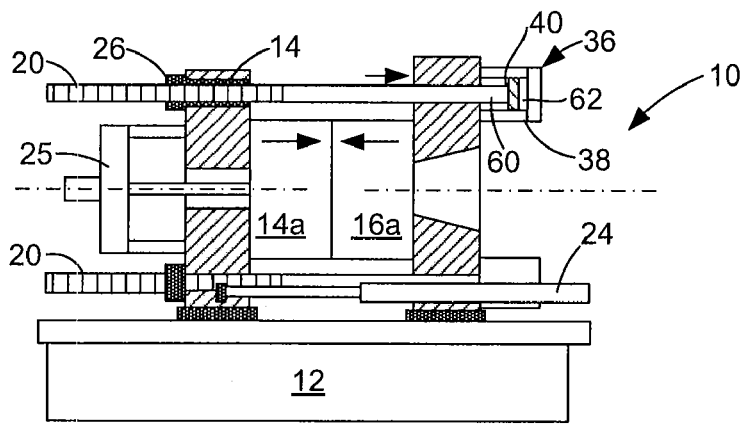
FIG. 1c shows the machine of FIG. 1b with a clamping force exerted across the mold halves.

Once the locking devices 26 have been moved to the locked position, and the piston has moved to the pre-clamp (datum) position, the clamp chamber 60 can be pressurized so as to exert a clamping force urging the mold halves 14a, 16a together. The piston 40 would be urged further in the clamping direction (i.e. further to the right as shown in FIG. 1c), stretching the tie bars 20 (within their elastic deformation limit) and pulling the mold halves 14a, 16b tightly together. At an appropriate clamping force, the resin (or melt) can be injected into the mold.

After the molded article has hardened sufficiently to allow ejection, the pressure in the clamp chamber 60 can be relieved and the unclamp chamber 62 can be pressurized so as to exert a mold break force urging the mold halves 14a, 16a apart and moving the piston 40 to the unclamped position (as shown, for example, in FIG. 1a). The locking devices 26 can be moved to the unlocked position so as to unlock the moving platen 14 from the tie bars 20. The traverse actuator 24 can then be energized to retract the moving platen 14 to an open position spaced away from the stationary platen 16. An ejection mechanism 25 can be energized to facilitate ejecting the molded article from the mold.

Pre-positioning the piston 40 to a datum position intermediate the clamp and unclamp positions can facilitate breaking open the mold after an injection cycle, by ensuring that the piston 40 has room to travel back towards the unclamped position after having been moved towards the clamping position. In some cases, the axial travel of the piston 40 in the clamping direction can be minimal (particularly where the machine has been tuned for maximum speed i.e. minimum cycle time). Additionally or alternatively, in some cases the mold can flash (resin squeezing out between the mold halves 14a, 16a) during injection, which can push the clamp piston 40 back towards the unclamp position (clamping force—and tie bar stretch—can remain generally unchanged during mold flash, but the piston can be displaced within the cylinder housing in response to displacement of the moving platen 14 as a result of the resin forcing its way out between the mold halves). This could, in cases where pre-positioning is not provided or not satisfactorily provided, cause the piston to bottom out in the cylinder in the unclamp direction (i.e. piston bears against back wall or other structural element that physically inhibits further travel of the piston in the unclamp direction).

If such bottoming out occurs while the tie bars are still loaded (i.e. bottoming out resulting from mold flash), then moving the locking devices 26 to the unlocked position can be very difficult or impossible. Destructive methods may then be required to open the mold and reset the machine for a new injection cycle. The teaching of the present invention can avoid this and/or other possible drawbacks by pre-positioning the piston 40 at an intermediate position within its range of travel in the housing 38 prior to clamping the mold halves together, so that ample travel in the unclamp direction is available after an injection cycle, even in cases where the mold may flash, and also providing sufficient forward travel in the clamping direction for applying a desired clamping force.

In some examples, the maximum stroke length of the piston in the cylinder housing can be in the range of about 15 to about 20 mm. The datum position of the piston can correspond to a position of about 6 mm to about 10 mm forward (in the clamp direction) of the fully back (unclamped) position, leaving, in the example illustrated, at least about 5 mm backward travel of the piston available for mold break. About 10 mm forward travel of the piston can be provided for clamping the mold halves together.

A variety of methods in accordance with the present teaching can be employed to accomplish the pre-positioning of the piston 40 to the intermediate pre-clamp position. In one example, when moving the platen 14 from an open position towards the closed position, the platen 14 can stop short of the stationary platen 16 so as to leave a positioning gap 77 between the mold portion 14a (secured to moving platen 14) and the mold portion 16a (secured to stationary platen 16) (see FIG. 1a). With the mold portions spaced apart by the positioning gap 77, and the piston in the shutter position, the locking devices can be moved to the locked position to secure together the moving platen 14 and the tie bars 20. The traverse actuator can then be energized to further advance the moving platen 14 to substantially close the positioning gap 77. During closing of the gap 77, the tie bars 20 are also advanced by the same amount as the platen 14, since the moving platen 14 and tie bars 20 are locked together. This moves the piston 40 from, for example, the unclamped position (FIG. 1a) to the intermediate datum position (FIG. 1b).

In some examples, when the mold portions 14a, 16a secured to the moving platen 14 and the stationary platen 16 are spaced apart by the positioning gap 77, and the moving platen 14 is locked to the tie bars 20, the clamp chamber 60 can be pressurized to urge the piston 40 (and tie bar 20) towards the clamping direction. This carries the moving platen 14 along to close the positioning gap 77. The pressure in the clamping chamber during closing the gap 77 can exert a closing force that is lower than the mold clamp force (e.g. lower pressure during closing the gap 77 than the pressure in the clamping chamber during injection of the resin). The traverse actuator 24 can be energized to work in cooperation with the clamp piston 40, or can, for example, be placed in neutral mode so as not interfere with, or be damaged by, the force exerted by the piston 40 during closing of the positioning gap 77.

In some examples, moving the clamp piston 40 to the datum position can include moving a stop member to an advanced position relative to the clamp piston 40 and cylinder housing 38, and urging the clamp piston 40 to bear against the stop member. An example of such a stop member is described subsequently herein, for example, at positioning member 182 in the apparatus 110. In the examples including a stop member, moving the clamp piston to the datum position can include pressurizing the unclamp chamber, and venting the clamp chamber to tank. Furthermore, a positioning chamber in communication with the stop member can be pressurized for urging the stop member to the advanced position. The stop member can be movably disposed between the clamp chamber and the piston, such that moving the stop member from the retracted to the advanced positions reduces the volume of the clamp chamber. In these examples, when advancing the moving platen from the open position towards the stationary platen, the traverse actuator can bring the mold portion 14a (of the moving platen 14) almost right up against the mold portion 16a (of the stationary platen 16) (i.e. no or zero positioning gap 77) prior to locking the moving platen to the tie bars. In the examples including a stop member, the known shutter position of the piston (mechanically referenced to the clamp cylinder housing) at which the locking devices can be moved to the locked position can be coincident with the intermediate datum position.

Figure 2:
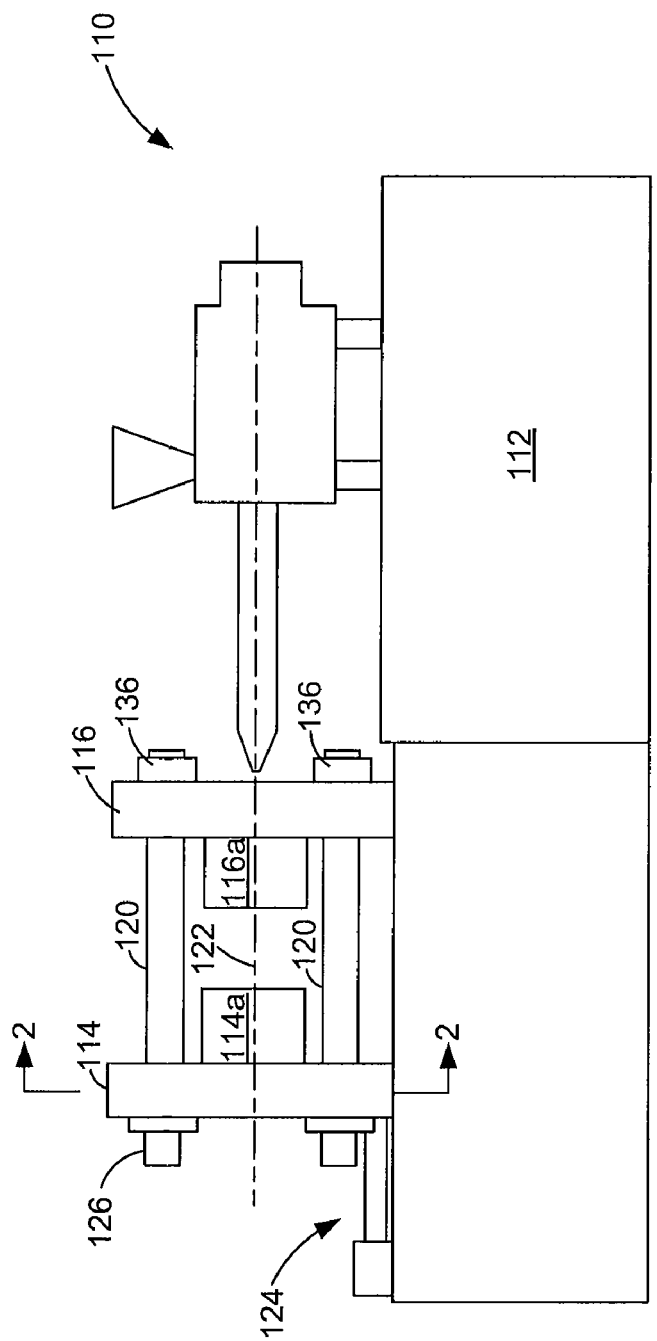
FIG. 2 is an elevation view of an injection molding machine according to some aspects of the Applicant's teaching.

Referring now to FIG. 2, an injection molding machine 110 includes a base 112 and a first platen 114 and a second platen 116 each mounted on the base 112. The first platen 114 is movable relative to the second platen 116 between open and closed positions. In the example illustrated, the second platen 116 is generally stationary relative to the base 112 during operation of the machine 110, and is also referred herein as stationary platen 116. The first platen 114, in the example illustrated, moves relative to the base 112 during operation of the machine 110 and is also referred herein as moving platen 114.

When in the closed position, the platens 114, 116 are drawn together. When in the open position, the platens 114, 116 are separated to facilitate removal of a molded article from a mold formed at least in part by first and second mold halves (mold portions) 114a, 116a affixed to the platens 114, 116, respectively.

Figure 3:
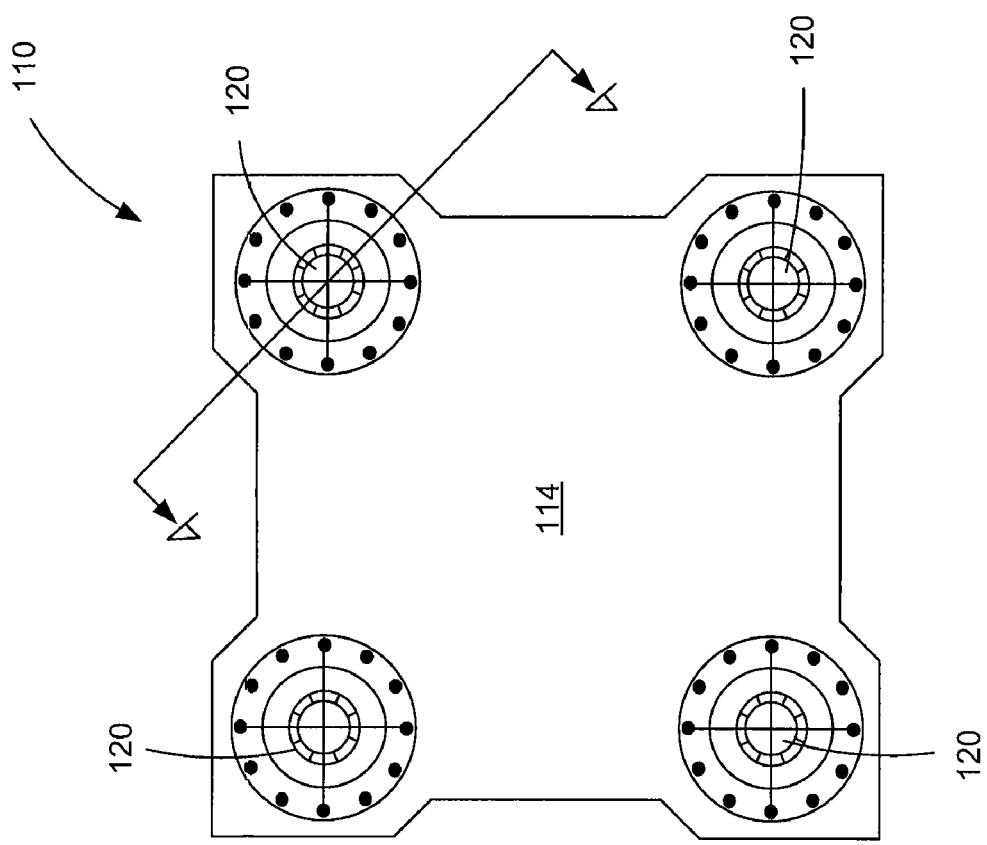
FIG. 3 is an end view of an upper portion of the machine of FIG. 1.

The machine 110 includes at least one tie bar 120 extending between the first and second platens 114, 116 for coupling the platens 114, 116 together. In the example illustrated, four tie bars 120 are provided. Each of the four tie bars 120 are positioned generally at respective corners of the two platens 114, 116 (FIG. 3). The tie bars 120 generally comprise elongate members aligned in parallel with a machine axis 122 along which the moving platen 114 translates (each tie bar 120 having a tie bar axis 123 parallel to the machine axis 122). A traverse actuator 124 can be coupled to the moving platen 114 to move the platen 114 between the open and closed positions. In the example illustrated, the traverse actuator 124 comprises a ball screw driven by a motor and in engagement with a nut fixed, for example, to the moving platen 114. In other examples, a belt drive system could be used as a linear actuator to move the moving platen 114 between the open and closed positions. One or more relatively long stroke, small diameter fluid cylinders could also be used as the traverse actuator.

Figure 4:
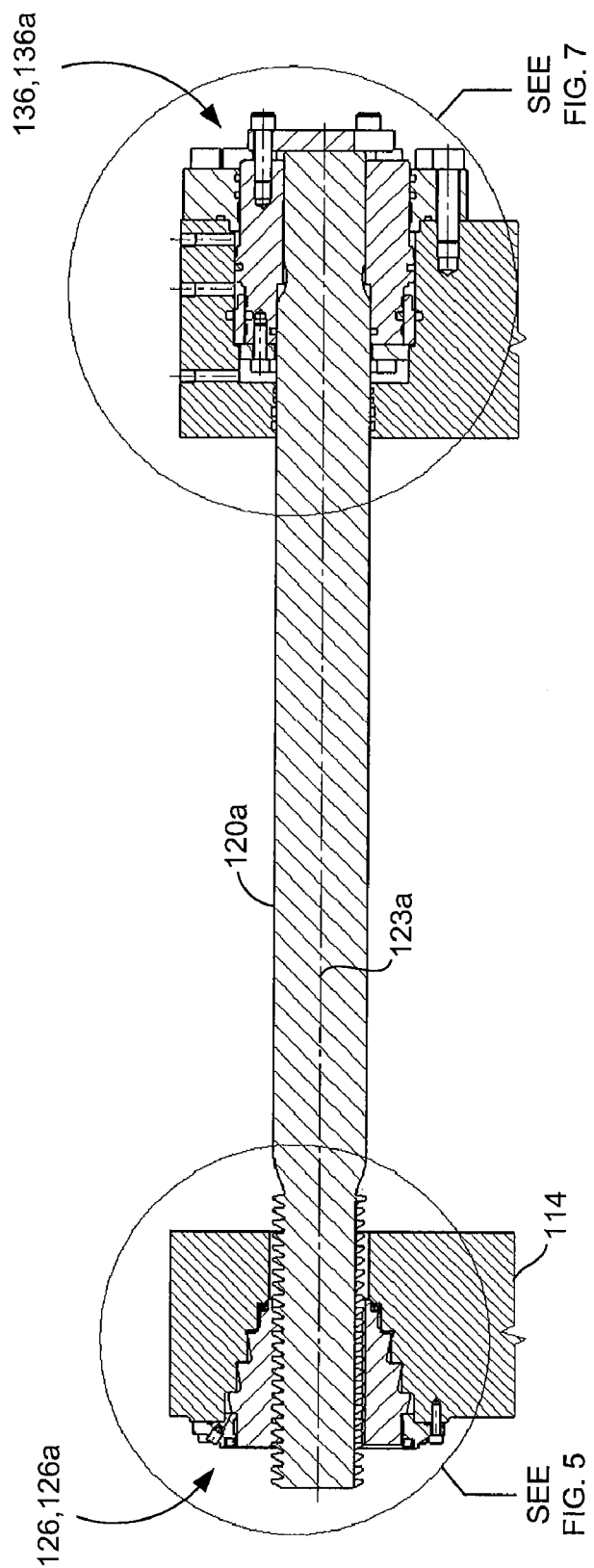
FIG. 4 is a cross-sectional view of a portion of the machine of FIG. 3, taken along the lines 4-4.
Figure 5:
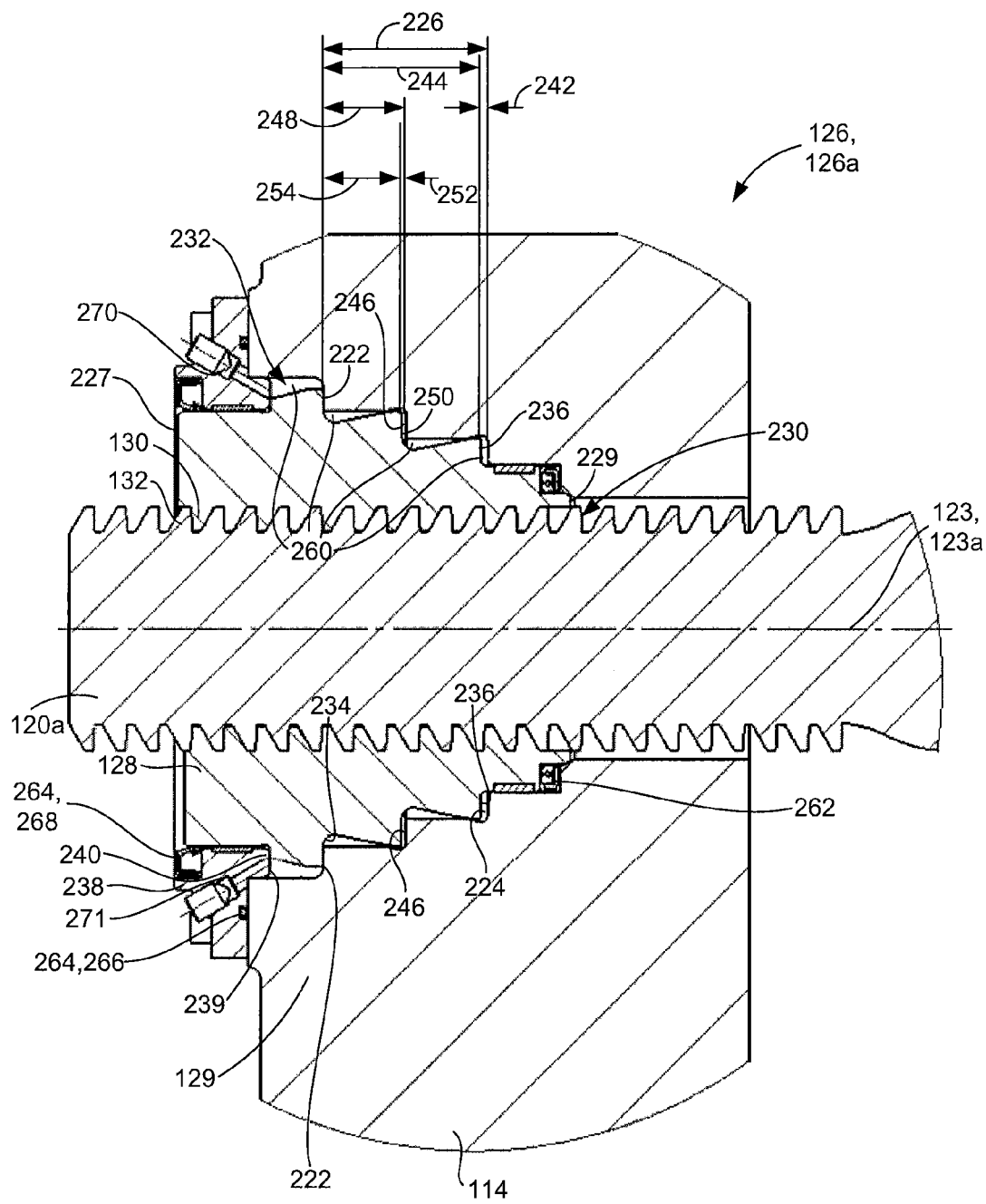
FIG. 5 is an enlarged view of a first portion of the structure shown in FIG. 4.

Referring to FIGS. 4 and 5, the machine 110 further includes at least one locking device 126 to selectively lock one of the platens 114, 116 to one of the tie bars 120. In the example illustrated, a first one of the locking devices 126 (identified as first locking device 126a) is mounted to the first platen 114 and associated with a first one of the tie bars 120 (identified as first tie bar 120a). The first locking device 126a selectively secures the first platen 114 to, and releases the first platen 114 from, the first tie bar 120a.

Figure 6:
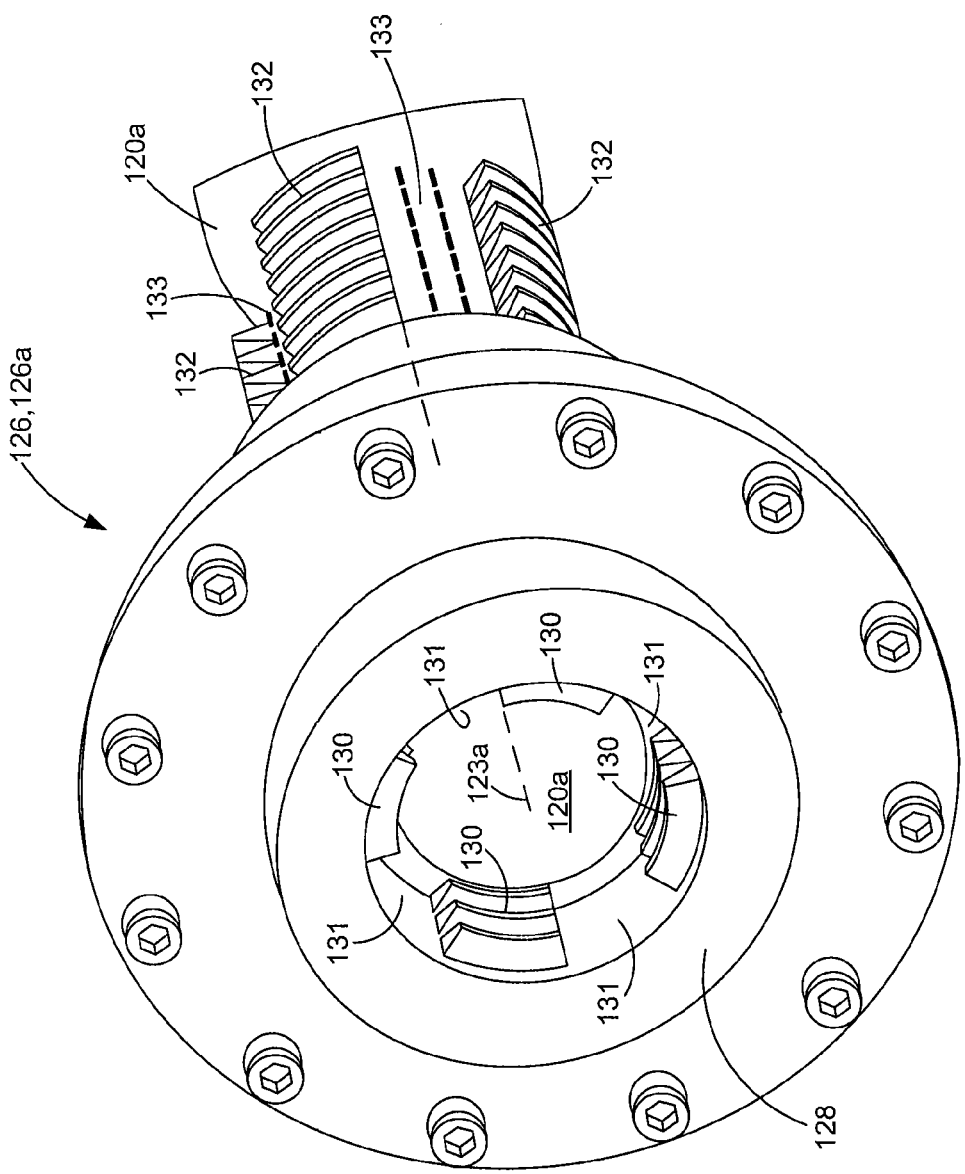
FIG. 6 is a perspective view of the structure of FIG. 4, shown in an unlocked position.

With reference also to FIG. 6, the first locking device 126a can comprise, for example, a lock nut element 128 of generally annular construction rotatably disposed in a housing 129 affixed to the moving platen 114. In the example illustrated, the lock nut 128 is provided with an inner bore with first teeth 130 arranged in axial rows, the rows spaced circumferentially apart by first axial grooves 131. The first tie bar 120a (having a first tie bar axis 123a parallel to the machine axis 122) can be provided with second teeth 132 that are similarly arranged in axial rows, spaced apart circumferentially by second axial grooves 133.

When in the locked position (as shown in FIG. 5), the first and second teeth 130, 132 are oriented to be in circumferential registration with each other, so that the first and second teeth inter-engage, thereby inhibiting relative axial motion between the first platen 114 and tie bar 120a. The lock nut 128 can be rotated relative to the tie bar 120 to an unlocked position (FIG. 6) in which the first teeth 130 are aligned with the second axial grooves 133 provided on the tie bar 120, and the second teeth 132 are aligned with the first axial grooves 131 of the lock nut 128, thereby allowing axial movement of the tie bar 120 through the lock nut 128.

Before moving the locking device 128 from the unlocked to the locked position, the tie bar 120 can be moved axially relative to the lock nut 128 to any one of a plurality of meshing positions in which the peaks of one set of teeth are in axial registration with the valleys between axially adjacent ones of the other set of teeth. Adjacent meshing positions are spaced apart axially by an amount generally equal to the pitch of the teeth. Providing a plurality of meshing positions can facilitate accommodating molds with different axial extents (different mold heights).

In one or more other examples, the locking device can comprise two half nuts, each having first engagement elements to engage teeth on the tie bar 120 when in the locked position, and which can be moved away from the tie bar 120 generally perpendicular to the length thereof to be clear of the tie bar when in the unlocked position.

Figure 7:
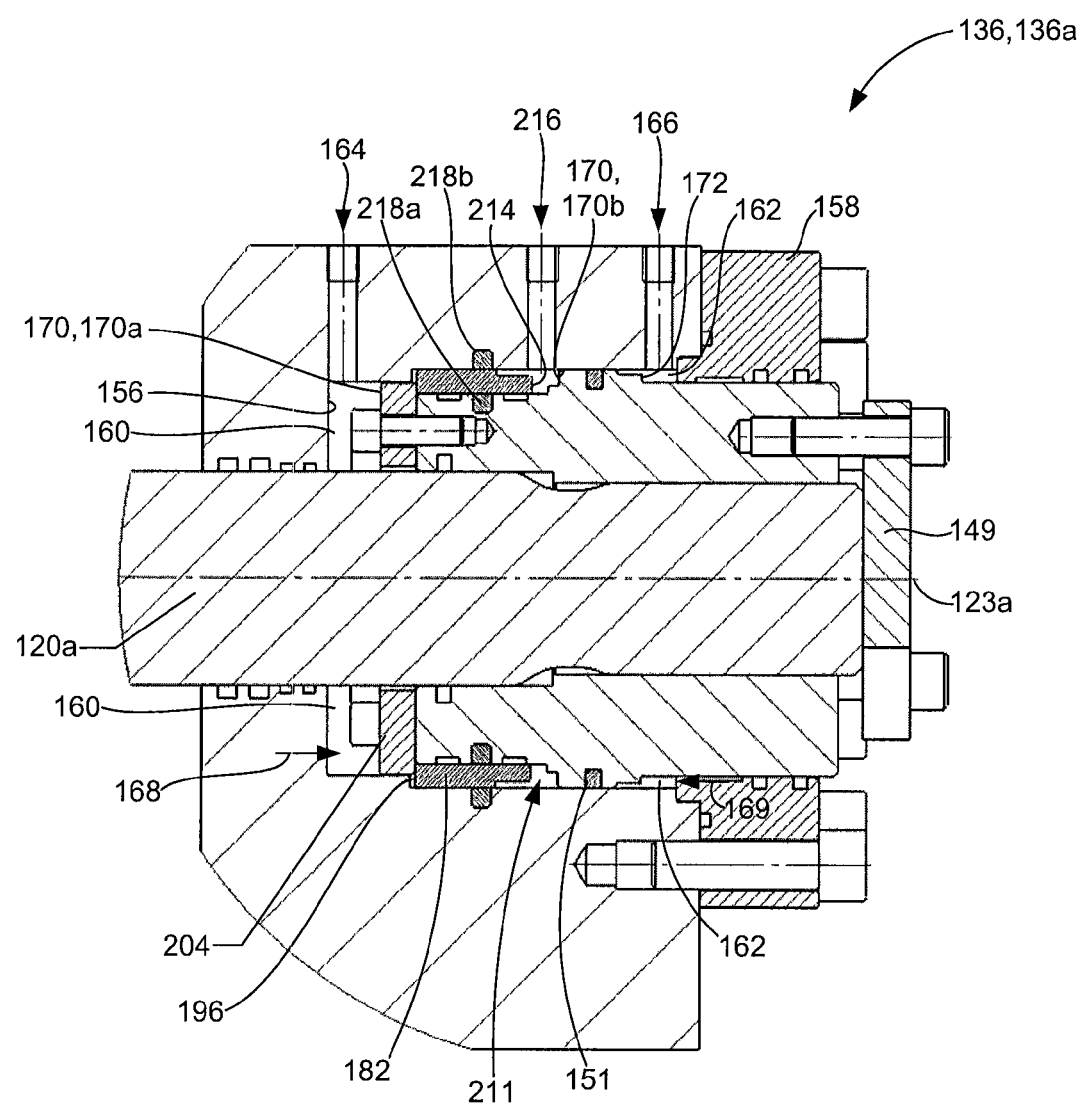
FIG. 7 is an enlarged view of a second portion of the structure shown in FIG. 4.

Referring to FIGS. 4 and 7, the machine 110 further includes at least one clamping mechanism 136 mounted to one of the platens 114, 116 and associated with one of the tie bars 120 for exerting a clamping force on the platens 114, 116 during the injection mold cycle. In the example illustrated, the machine 110 includes a first clamping mechanism 136a mounted to the second platen 116 and associated with the first tie bar 120a. The first clamping mechanism 136a selectively exerts a first force (clamping force) urging the first and second platens 114, 116 together, and has the capability to exert an optional second force (mold break force) urging the first and second platens 114, 116 apart. The first force can have a magnitude of, for example, 80, 120, or 200 tons or more. The second force can have a magnitude of about 5% to about 10% of the first force (i.e. clamping force can be about 10 to about 20 times (or more) greater than the mold break force).

The clamping mechanism 136a includes a cylinder housing 138 affixed to the second platen 116, and a piston 140 affixed to the first tie bar 120a and slidable within the cylinder housing 138. The language "affixed to" includes configurations in which the corresponding elements are separately joined together, or are made of integral, one-piece construction. In some examples, the cylinder housing 138 may include an insert or barrel separately attached to the platen. The piston 140 can, in some examples, be partially or entirely formed integrally with the tie bar.

Figure 8:
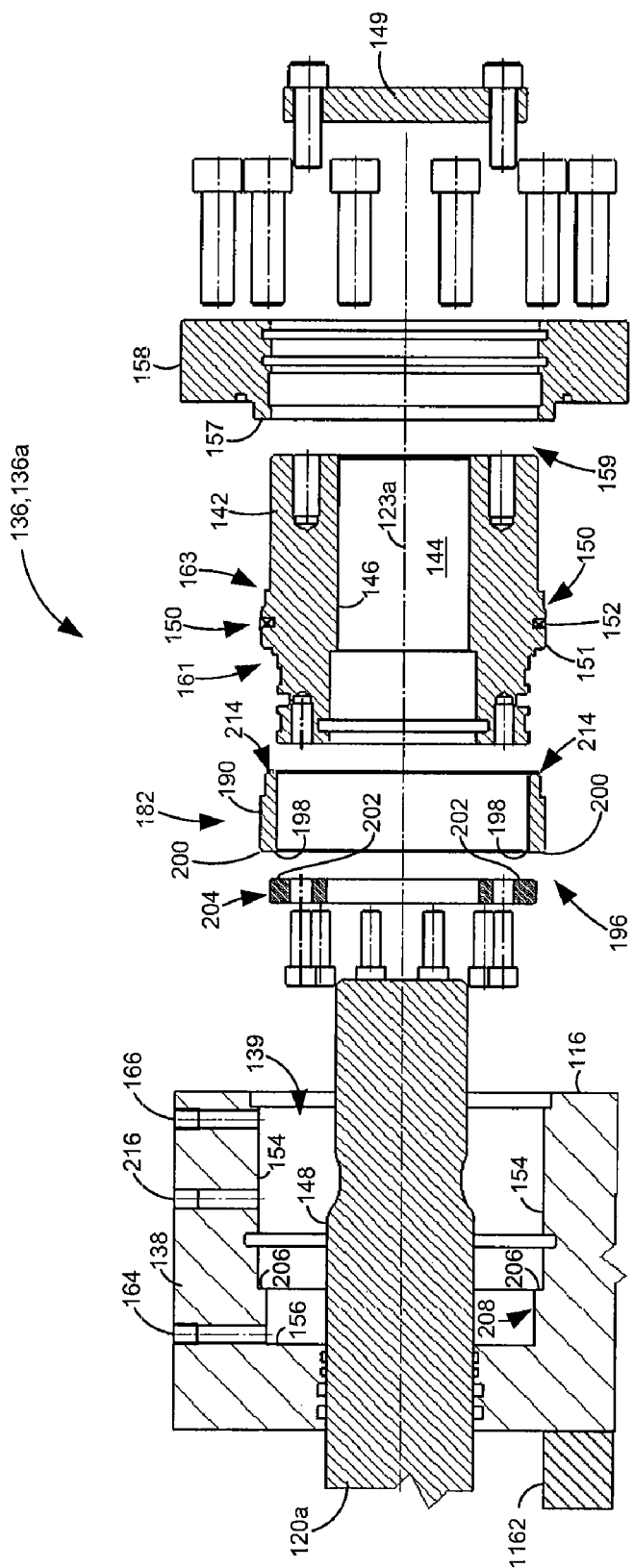
FIG. 8 is an exploded view of the structure of FIG. 7.

With reference also to FIG. 8, in the example illustrated, the cylinder housing 138 comprises a pocket 139 machined in the stationary platen 116, the cylinder housing 138 being integral with the platen 116. The piston 140, in the example illustrated, comprises a piston head 142 separately attached to the tie bar 120a. The piston head 142 includes an axial bore 144 that has internal threads 146, for engagement with external threads 148 provided along an end portion of the tie bar 120a. A keeper 149 can be positioned across the distal end face of the tie bar 120 and bolted to the end face of the piston head 142 to facilitate locking the piston head 142 in position relative to the tie bar 120.

The piston 140 further includes, in the example illustrated, a seal journal 150 fitted with a piston seal 151 having a radially outer surface 152 in sealed engagement with an inner surface 154 of the cylinder housing 138. The cylinder housing 138 has a proximal end wall 156 axially nearest the second mold half 116a, and a distal end wall 157 spaced axially apart from the proximal end wall 156. In the example illustrated, the distal end wall 157 comprises a cylinder cap 158 bolted to the platen 116 and having a bore 159 therethrough, an end portion of the piston 140 slidably received through the bore 159.

As seen in FIG. 7, the piston 140 and cylinder housing 138 cooperate to form a first chamber (also called a clamping chamber) 160 on one side (clamp side 161) of the seal journal 150, and a second chamber (also called an unclamp chamber) 162 on a second side (unclamp side 163) of the seal journal 150 of the piston 140, axially opposite the first (clamp) side 161. Fluid can be fed into the clamp and unclamp chambers 160, 162 via a clamping port 164 and unclamp port 166, respectively. In the example illustrated, the clamp and unclamp ports 164, 166 open to an exterior side of the cylinder housing 138.

In the example illustrated, the clamp side 161 and clamping chamber 160 are disposed proximal the second mold half 116a (relative to the seal journal 150), and the unclamp side 163 and unclamp chamber 162 are disposed axially distal the second mold half 116a. Pressurizing the clamping chamber 160 can exert a force (axially in a clamp direction 168) on a clamp face 170 of the piston 140, the clamp face 170 directed toward the second mold half 116a. Pressurizing the unclamp chamber 162 can exert an axial force (in an unclamp direction 169) on an unclamp face 172 of the piston, opposite the clamp face 170.

Each of the clamp and unclamp faces 170, 172 can comprise a single face, or a plurality of face sections spaced apart axially and/or radially along the piston head 142. In the example illustrated, the clamp face 170 includes a clamp end face portion 170a (generally defined by the surface area of the retaining ring 204 directed towards the proximal end wall 156—described further in relation to FIG. 8), and a clamp stepped face portion 170b generally defined by the surface area of the annular orthogonal wall portion of the seal journal 150 facing towards the proximal end wall 156. The unclamp face 172 is, in the example illustrated, generally defined by the surface area of the annular orthogonal wall portion of the seal journal 150 facing away from the proximal end wall 156 (i.e. the face of the seal journal 150 directed towards the unclamp side 163). The surface of the unclamp face 172 can be stepped or notched at an outer radial edge thereof, for example, to facilitate fluid flow into (or out of) the unclamp chamber 162 (via port 166) even when the piston 140 is advanced to its maximum travel position in the clamping direction (right-most position relative to the cylinder housing 138).

Figure 10:
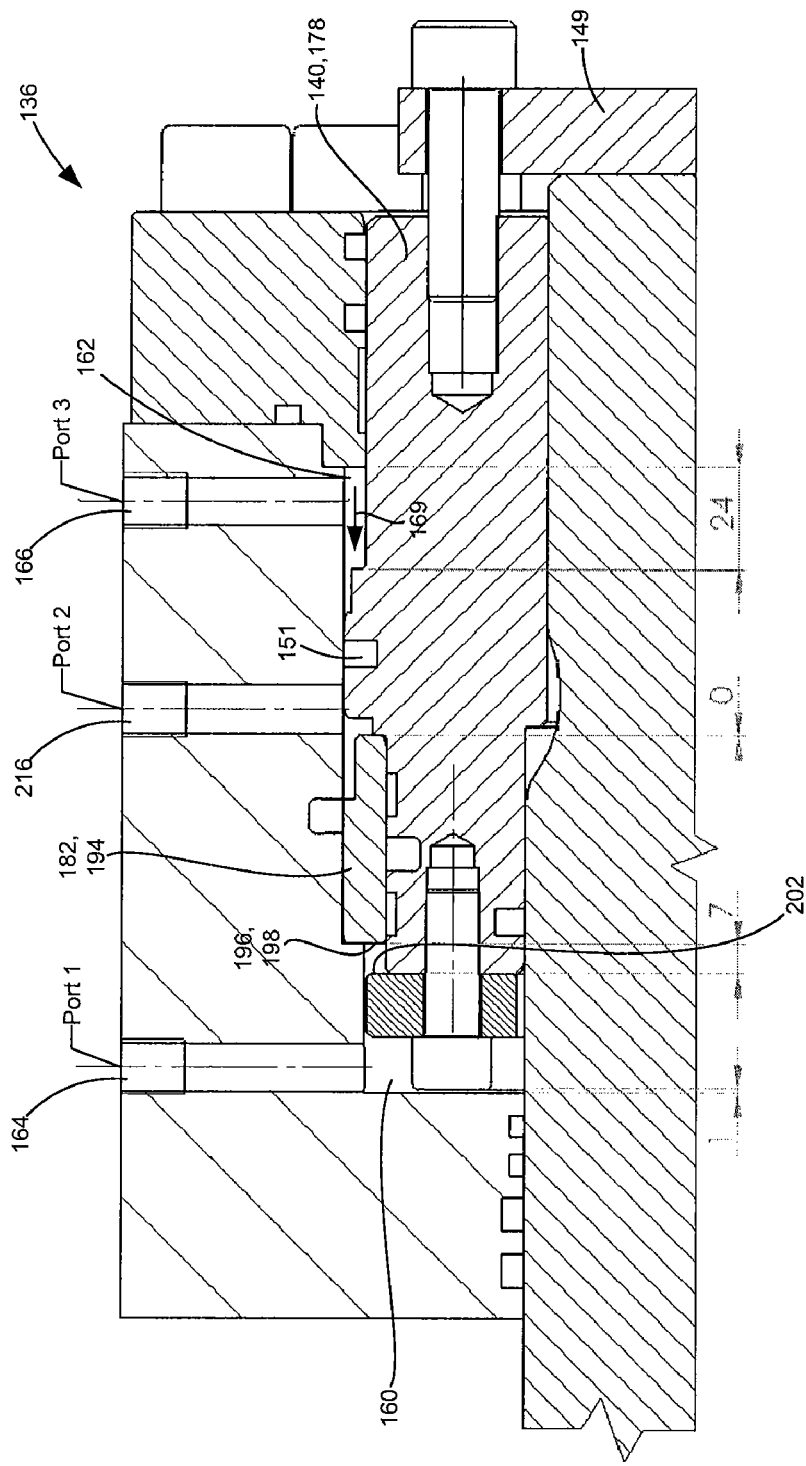
Figure 11:
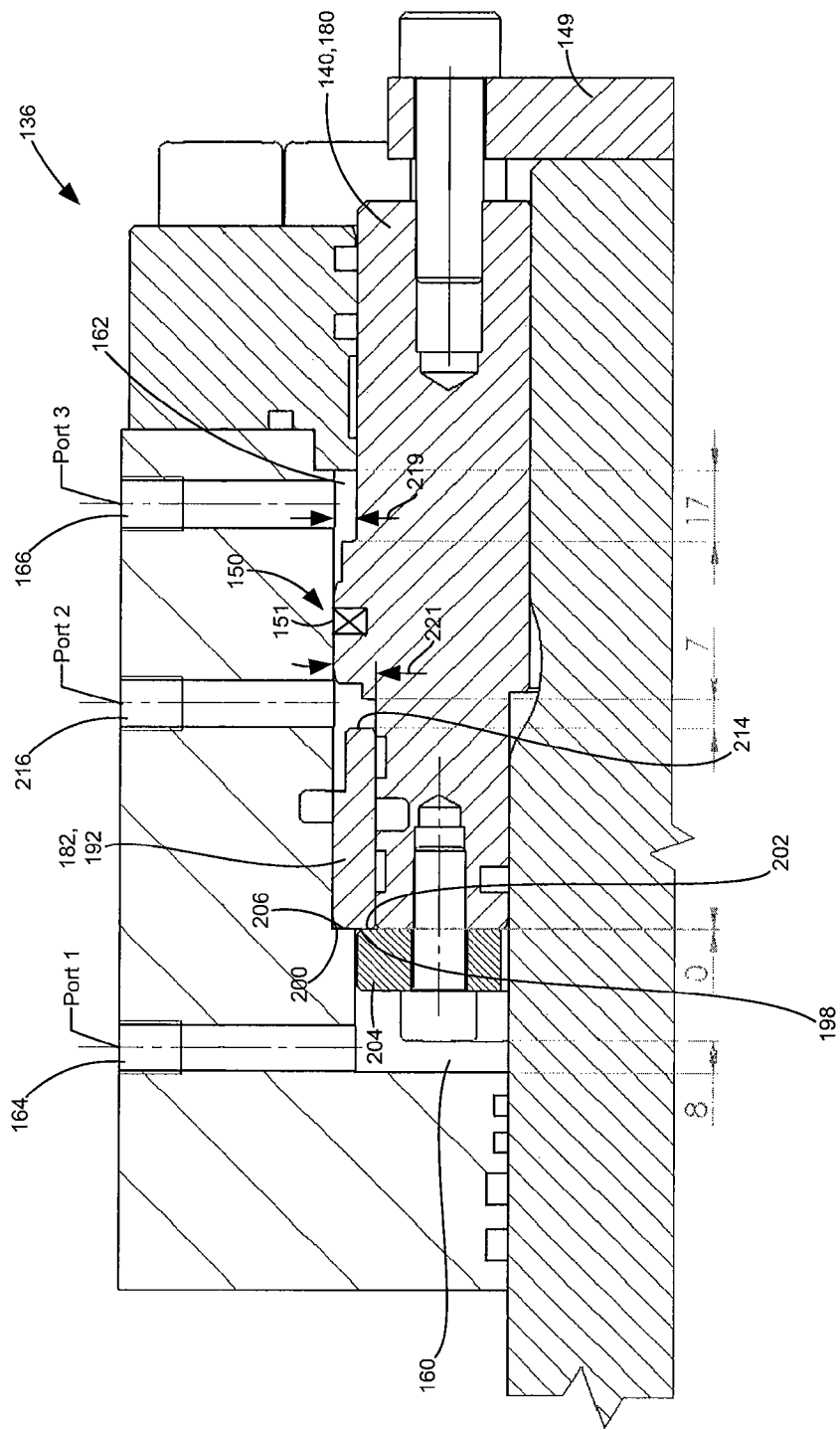

The piston 140 is axially slidable within the cylinder housing among a clamping position 176 (FIG. 9), an unclamped position 178 (FIG. 10), and a datum position 180 (FIG. 11). The maximum axial spacing between the clamping position 176 and the unclamped position 178 can generally be defined by axially opposed end walls (e.g. end walls 156, 157), and/or radially inwardly protruding step walls (e.g. step wall 206), between which the piston 140 is confined to travel. The datum position 180 is, in the example illustrated, located axially intermediate the clamping and unclamped positions 176, 178.

The piston 140 can be moved to, and selectively released from, the datum position 180. In the example illustrated, the locking device 126 can be moved from the unlocked to the locked position when the piston 140 is in the datum position (i.e. the intermediate datum position coincides with the shutter position, wherein the axial position of the piston 140 is in a mechanically referenced, known position relative to the stationary platen, so that the axial position of the tie bar and its teeth relative to the moving platen (and the teeth of the lock nut mounted thereto) can be accurately computed via the machine coordinate system). The datum position 180 also defines the position of the piston 140 at which clamping together of the platens 114, 116 is initiated (i.e. delivery of pressurized fluid to the clamping chamber 160 for generating the clamp force is initiated when the piston 140 is in the datum position 180). Initiating clamp-up at an axially intermediate position (i.e. at the datum position 180) can ensure that sufficient axial piston travel is available in both the clamp direction 168 (to apply the required clamp force), and in the unclamp direction 169 (to effect separation of the mold halves 114a, 116a after an injection cycle). Sufficient travel in the unclamp direction 169 can be particularly advantageous in cases where the machine 110 is set up such that minimal axial displacement of the moving platen 114 occurs during clamp-up, and/or in cases of mold flash during the injection cycle.

The datum position 180 can be defined by a mechanical stop member configured to inter-engage with the piston 140 and the cylinder housing 138 when the piston 140 is in the datum position 180. This can facilitate mechanically referencing the position of the piston 140 relative to the housing 138 when in the datum position. In the example illustrated, the clamping mechanism 136 includes (as an example of a stop member) a positioning member 182 moveable between advanced and retracted positions 192, 194. The positioning member 182 is moveable relative to the piston 140 and relative to the cylinder housing 138, and can be selectively retained in, and released from, the advanced position 194.

In the example illustrated, the stop member (positioning member) 182 comprises an annular body or sleeve 190 (FIG. 8) slidably coupled to the piston 140, and coaxial therewith. The positioning member 182 is axially displaceable relative to the piston 140 between the advanced and retracted positions 192, 194. The positioning member comprises a proximal end face 196 having a radially inner portion defining a first contact surface 198, and a radially outer portion defining a second contact surface 200. The contact surfaces 198, 200 cooperate with other elements to provide a positive mechanical stop for the positioning member 182. In the example illustrated, the first and second contact surfaces 198, 200 are generally coplanar, and are disposed adjacent an axial end (proximal end 196) of the positioning member nearest the second mold half 116a.

The piston 140 has a first abutment surface 202 for engagement with the first contact surface 198 of the positioning member 182 when the positioning member 182 is in the advanced position 194. The first abutment surface 202 is fixed to, and moves with, the piston 140 during operation of the machine 110. In the example illustrated, the first abutment surface 202 comprises a radially outwardly protruding shoulder portion of a retaining ring 204 mounted to the proximal end of the piston head 142. The first abutment surface 202 is spaced apart from the seal journal 150 on the clamping side 161 of the piston 140. The positioning member 182 can generally move axially between the first abutment surface 202 and the seal journal 150. Displacement of the positioning member 182 towards the seal journal 150 generally corresponds to the retracted position 194 of the positioning member 182 relative to the piston 140. In the example illustrated, the positioning member 182 is disposed on the clamp side 161 of the seal journal 150 of the piston 140.

A second abutment surface 206 is affixed to the cylinder housing 138 for engagement with the second contact surface 200 of the positioning member 182 when the piston 140 is in the datum position 180 and the positioning member 182 is in the advanced position 194. The second abutment surface 206 is in an axially fixed position relative to the stationary platen 116 during operation of the machine 110. In the example illustrated, the second abutment surface 206 comprises an annular radially inwardly protruding step 208 extending from the inner surface 154 of the cylinder housing 138.

A pushing member 211 can be provided for exerting a positioning force on the positioning member 182 to move and/or releasably retain the positioning member 182 to/in the advanced position. In the example illustrated, the pushing member 211 comprises a positioning fluid chamber 212. The positioning force is generated by pressurizing the positioning fluid chamber 212 which is adjacent to, and in fluid contact with, a distal end face 214 of the positioning member 182. The distal end face 214 of the positioning member is generally defined by a radially extending end wall of the annular body 192, disposed axially opposite the proximal end face 196. Fluid can be supplied to or evacuated from the positioning fluid chamber 212 via a positioning port 216, which, in the example illustrated, extends radially through the cylinder housing 138, at a position axially between the clamping port 164 and the unclamp port 166. The distal end face 214 can be stepped or notched at its radially outer edge to help ensure satisfactory fluid communication between the positioning fluid chamber 212 and the positioning port 216, even when the positioning member 182 is at its maximum rightward travel position relative to the positioning port 212 (i.e. when the positioning member is in the fully retracted position 194 and the piston 140 is in the clamp position 176).

In the example illustrated, the positioning fluid chamber 212 is disposed (axially) on the clamping side 161 of the piston 140 (i.e. on the clamping side 161 of the seal journal 150), between the positioning member 182 and the seal journal 150 of the piston 140. The positioning chamber 212 extends radially between an outer surface of the piston 140 and the inner surface 154 of the housing 138 (FIG. 7). One end (i.e. proximal axial end) of the positioning chamber 212 is, in the example illustrated, sealed by the seal journal 150 (with seal 151). The opposite end (distal axial end) can be sealed by radially inner and outer positioning member seals 218a, 218b, respectively. The radially inner positioning member seal 218a can be disposed between the inner surface of the positioning member 182 and an outer surface of the piston 140. The radially outer positioning member seal 218b can be disposed between an outer surface of the positioning member 182 and the inner surface 154 of the cylinder housing 138.

In use, an example is considered where new mold halves 114a, 116a are installed on the platens 114, 116, and wherein the shut-height of the new mold is not known. Once the mold halves have been attached to the platens, and with the locking devices 126 in the unlocked position, the traverse actuator 124 can be energized to jog the moving platen 114 (e.g. in set-up mode) towards the stationary platen 116 until the mold is closed (mold halves 114a, 116a just or nearly touch).

Prior to completing the step of closing the mold, the clamping mechanisms 136 (and pistons 140 thereof) can be moved to the datum position 180, by pressurizing the positioning fluid chamber 212 and the unclamp chamber 162 with, for example, hydraulic fluid, and opening the clamping port 164 to tank to evacuate fluid from the clamp chamber 160. The positioning force exerted by the pressurized positioning fluid chamber 212 urges the positioning member 182 left (in the unclamp direction 169 in FIG. 10) relative to the piston 140 (in other words, urges the piston 140 right relative to the positioning member 182), so that the first contact surface 198 bears against the first abutment surface 202 (FIG. 11). The pressure in the unclamp chamber 162 exerts a datum force on the piston, urging the piston 140 (with the positioning member 182 coupled thereto) towards the left in FIG. 11, so that the second contact surface 200 engages the second abutment surface 206. The datum force on the piston 140 urging the piston left relative to the positioning member 182 (so as to urge the positioning member towards the retracted position) is less than the positioning force urging the piston right relative to the positioning member (urging the positioning member to the advanced position), so the positioning member 182 remains in the advanced position 192 relative to the piston 140 and the piston is retained in the datum position 180 (in the position as shown in FIG. 11).

To provide a datum force (exerted by the pressurized unclamp chamber 162) that is less than the positioning force (exerted by the pressurized positioning fluid chamber 212), the pressure of the fluid can be lower in the unclamp chamber 162 than in the positioning fluid chamber 212. Alternatively or additionally, the effective relative surface areas against which the fluid in the respective chambers 162, 212 bears can be configured to ensure the desired differential in axial forces is achieved. In the example illustrated, the surface area of the unclamp face 172 of the piston (having a radial extent 219) is less than the surface area of the distal face 214 of the positioning member 182 (having a radial extent 221, which subsumes and extends beyond the radial extent 219). Having differently sized surface areas of the faces on which pressurized fluid in the chambers 212, 162 act can provide the desired difference in force magnitudes while having equal fluid pressure in the chambers 212, 162, which can reduce the number of pressure control valves (or similar) required in the machine 110.

The machine 110 can include a controller in communication with an encoder, linear transducer, or the like for accurately reading the axial position of the moving platen 114 relative to a machine coordinate system, and so the position of the moving platen 114 corresponding to the mold closed position can be recorded in the machine controller. When the piston 140 is in the datum position 180, the precise axial position of the tie bar 120 (and its teeth 132) relative to the stationary platen 116 (and hence relative to the machine coordinate system) is known. This can facilitate accurate movement of the platen 114 (with lock nut 128) to a meshing position relative to the tie bar 120.

The recorded "mold closed" position of the moving platen 114 can be compared to the nearest previous meshing position for the locking device 126 (i.e. relative axial position in which the peaks of one set of teeth are axially aligned with the valleys of the other set of teeth). The moving platen 114 can then be moved back (in the unclamp direction) to that nearest meshing position (by an axial distance defined as an offset amount), and this new position of the moving platen can be recorded in the controller as the "rapid advance" position for future injection cycles with the given mold halves 114a, 116a. In other words, the axial position of the rapid advance position to which the moving platen is shuttled by the traverse actuator corresponds to a meshing position (position of the moving platen 114 relative to tie bar 120 in which the locking device 126 can be moved to the locked position) and to a near mold closed position (or mold closed position if offset is about zero) of moving platen 114 relative to stationary platen 116.

The offset amount need generally not be more than the pitch of teeth of the locking device 126, and can range, for example, from near or equal 0 mm to about 4 mm or about 12 mm. The magnitude of the offset amount can be minimized (and can in some cases be reduced to about zero) by loosening the keepers 149 and rotating the piston head 142 relative to the tie bars 120 to adjust the relative axial position of the tie bar 120 (and its teeth 132) when the piston 140 is in the datum position. This can adjust the axial position of the meshing positions with respect to the stationary platen 116.

Once the offset and the rapid advance positions have been established, the machine can be returned to a home state (locking devices unlocked, mold fully opened). Normal run mode can then be initiated.

In run mode, the traverse actuator 124 can shuttle the moving platen 114 to the rapid advance position (i.e, towards the closed position, and at an axial position that corresponds to a meshing position). Generally prior to completing this shuttling step, the pistons 140 of the clamping mechanisms 136 can each be moved to the datum position, so that the tie bars 120 are also in a meshing position when the traverse actuator 124 completes shuttling the moving platen to the rapid advance position. The locking devices 126 can then be moved to the locked position.

Figure 9:
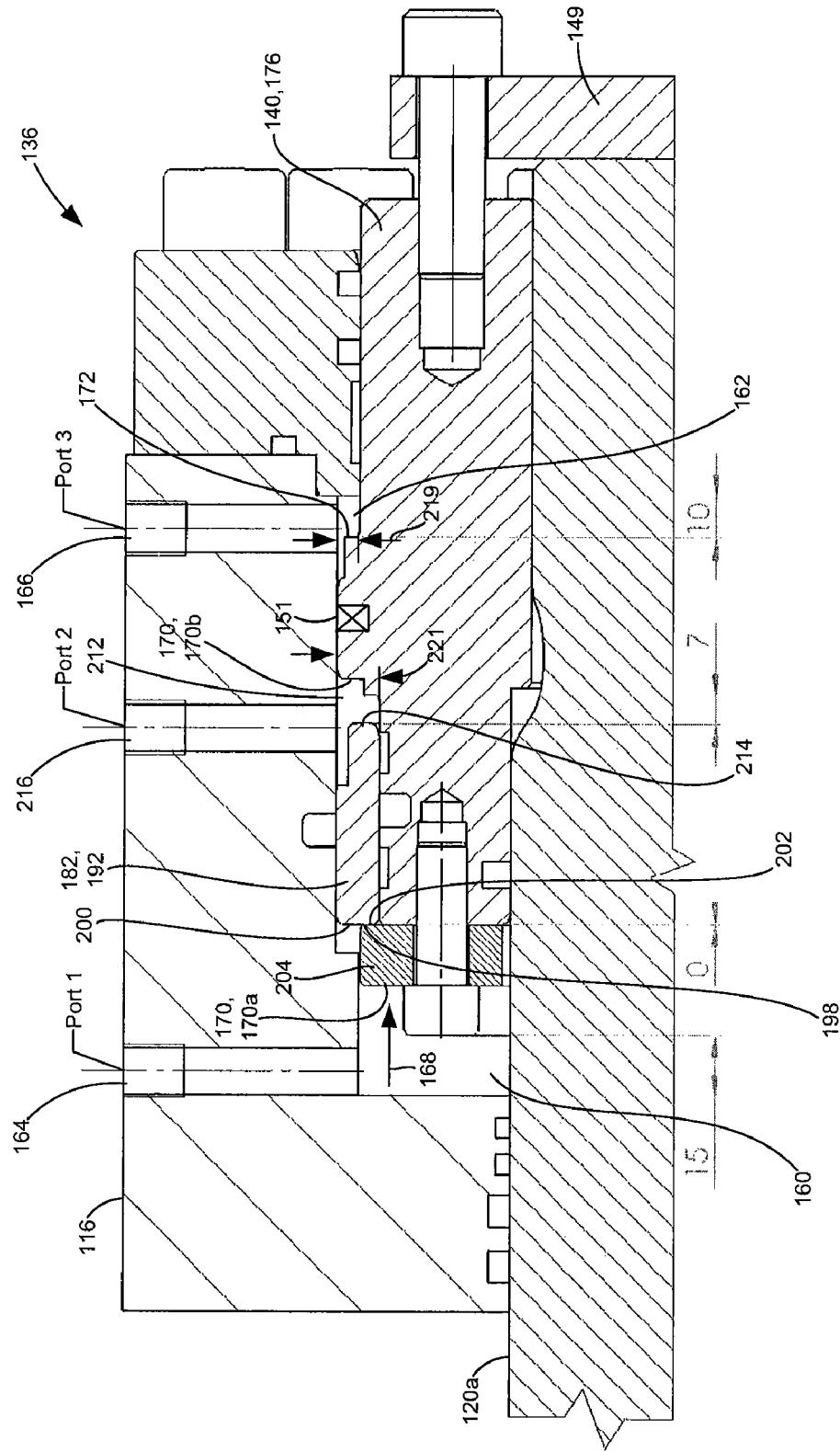
FIGS. 9, 10, and 11 show the clamping device of FIG. 7 in a clamped, unclamped, and datum position, respectively.

With the moving platen 116 locked to the tie bars 120, and the piston 140 already in the datum position 180 (from the previous step), the clamp force can be applied (FIG. 11). In case where the axial distance between the mold portions 114a, 116a is minimal or near zero, the clamp load can be applied immediately after the locking devices have moved to the locked positions. For each of the clamping mechanisms 136, pressurized fluid can be fed into the clamping chamber 160 (via clamping port 164), and the unclamp port 166 can be opened to tank, relieving any pressure in the unclamp chamber 162 (FIG. 9). In the example illustrated, the clamp force exerted by the pressurized fluid in the clamp chamber 160 is greater then the unclamp force, and can be from about 10 times to about 20 times (or a higher factor) greater than the unclamp force. The effective surface area of the face on which the pressure in the clamp chamber 160 acts (i.e. directly acting on surfaces 170a and 196 as seen in FIG. 7) can be greater than the surface area of the unclamp face 172 by a corresponding proportional amount. The clamp chamber 160 can be pressurized (during clamp up) with fluid at the same pressure as that provided to the unclamp chamber 162 (during mold break), and the desired difference in force magnitude can be provided as a result of the difference in effective surface areas on which the pressurized fluid acts.

During clamping together of the mold halves 114a, 116a, the positioning chamber 212 can be, but need not be, maintained in a pressurized state. Maintaining pressurized fluid in the positioning chamber 212 can reduce the oil consumption required for filling the clamping chamber 160 upon clamp-up, by keeping the positioning member 182 in or near the advanced position 192 and so reducing the volume of the clamping chamber 160 to be filled upon clamp-up. In the example illustrated, the effective surface areas of the axially opposite faces of the positioning member exposed to the clamping chamber 160 and the positioning chamber 212 are about equal (i.e. the effective surface are of distal end face 196 is generally equal to the effective surface area of proximal end face 214. During mold clamping, fluid at about the same pressure setting is fed into each of the clamping chamber 160 and the positioning chamber 212. The positioning member 182 is in the advanced position when clamping is initiated, and remains in that position since the left and right axial forces acting on the respective end faces are generally balanced. The force exerted by the pressure of the fluid in the clamping chamber 160 is transmitted through the positioning member 182 and through the pressurized fluid in the positioning chamber 212, and ultimately against the clamp side 161 of the seal journal (face 170b) (FIG. 9).

Once the piston 140 has moved to the clamping position (to the right as shown, for example, in FIG. 9) and the desired clamping pressure is achieved, the melt can be injected into the mold halves 114*a*, 116*a*.

Upon completion of injection and after waiting a period of time as may be required for sufficient solidification of the molded articles, clamp pressure can be released (opening the clamp valve 164 to tank). Optionally, in cases where necessary, an unclamp (mold break) force can be applied by the clamping mechanisms 136. To apply a mold break force, the unclamp chamber 162 can be pressurized via the unclamp port 166, and the positioning chamber 212 can be depressurized (opening port 216 to tank), so that as the piston moves in the unclamp direction 169 (to the left in FIG. 9), the piston can move past the datum position without interference with the positioning member 182 that would otherwise stop the piston in the datum position (i.e. positioning member 182 can move towards the retracted position 194; see FIG. 10). Accordingly, even with minimal forward travel of the piston 140 for clamp-up, or in cases of mold flash, sufficient travel of the piston (and hence the moving platen 114) in the unclamp direction 169 is available by urging the piston axially (in the unclamp direction) past the datum position.

Once the pressure in the clamp chamber has been relieved, and (in cases where a mold break force has been applied) after the piston has been moved to the unclamp position, the locking device(s) 126 can be moved to the unlocked position. The traverse actuator 124 can then be energized to shuttle the moving platen 114 back to an open position, away from the stationary platen 116. The molded articles can be ejected from the mold halves 114*a*, 116*a*, and the next cycle can commence. In some examples, the piston 140 can be moved back to the datum position while the traverse actuator shuttles the moving platen 114 to the open position, and/or during ejection of the molded articles. Moving (or at least partially moving) the piston to the datum position during one or both of the advance and return strokes of the traverse actuator 124 can save cycle time.

Further details of other aspects of the machine 110 will now be described. With reference again to FIG. 5, in the example illustrated, the locking device comprises a lock housing 129 having an inner surface affixed to the moving platen 114 and extending coaxially with the tie bar axis 123*a*. In the example illustrated, the housing 129 is integral with the platen 114 and comprises a bore provided in the platen. The inner surface of the housing 129 can be stepped, providing a first bearing face 222 and a second bearing face 224 each extending generally radially inwardly of the housing 129 at spaced apart locations along the axis of the housing. In the example illustrated, the first and second bearing faces 222, 224 are spaced axially apart by a first housing spacing 226. The first bearing face 222 is, in the example illustrated, positioned axially away from (or distal) the stationary platen 116. The second bearing face 224 is axially nearest (or proximal) the stationary platen 116.

The lock nut 128 of the locking device 126 is received within the housing 129 and rotatable within the housing about the axis 123*a* between the locked and unlocked positions. The lock nut 128 has a generally annular body with axially opposite first and second ends 227, 229. The first end (distal end) 227 is directed away from the stationary platen 116, and the second end (proximal end) 229 is directed towards the stationary platen 116. An inner bore 230 extends coaxially through the nut 128 from the first end to the second end, for receiving the tie bar 120 therethrough. The inner bore 230 defines a radially inner surface having radially inwardly projecting elements (i.e. first teeth 130 in the example illustrated) extending therefrom. The projecting elements 130 engage the tie bar 120 when the lock nut 128 is in the locked position, to transfer the axial clamp load (and unclamp load) from the tie bar 120 to the lock nut 128.

The body of the lock nut 128 has a radially outer surface 232 opposite the inner surface, the outer surface 232 including first and second step faces 234, 236 for abutting the first and second bearing faces 222, 224, respectively, to cooperatively transfer the axial clamp load from the lock nut 128 to the platen 114. The bearing faces 222, 224 are, in the example illustrated, generally planar surfaces oriented generally perpendicular to the axis 123.

In the example illustrated, the first (distal) step face 234 abuts the first bearing surface 222 generally continuously during operation of the machine 110. The surfaces 234, 222 are in flush engagement whether or not a clamp load is being applied across the platens 114, 116. An annular retaining plate 238 can be mounted to the platen 114 for engaging the nut 128 and holding the first step face 234 against the first bearing surface 222. The retaining plate 238 can have a radially inwardly protruding wall 239 that bears against a shoulder surface 240 protruding radially outwardly from the nut 128, at an axial position spaced rearward (distally) of the first step face 234. The contact between the surfaces 222, 234 can serve a locating function, providing a known position of the teeth 130 relative to the moving platen 114 (and hence to the machine coordinate system), at least when the tie bars 120 and lock nut 128 are unloaded (i.e. in relaxed, untensioned state). Engagement between the faces 239 and 240 can also be used, in the illustrated example, to transfer an unclamp force from the nut 128 to the platen 114.

The second step face 236 can be spaced apart from the second bearing surface 224 when the lock nut 128 is unloaded (for example by a first stretch gap 242), and the second step face 236 can abut the second bearing surface 224 when the axial clamp load is applied to the nut 128. In the example illustrated, the second step face 236 is axially spaced apart from the first step face 234 by a first (proximal) nut spacing 244. The proximal nut spacing 244 is less than the first housing spacing 226 when the nut 128 is unloaded, the difference between the first housing spacing 226 and the first nut spacing 244 being equal to the first stretch gap 242.

The lock housing 129 can be provided with additional axial load bearing surfaces, such as, for example, a third (intermediate) bearing surface 246 positioned axially intermediate the first and second bearing surfaces 222, 224. The third bearing surface 246 is, in the example illustrated, oriented generally perpendicular to the axis 123, and is spaced apart from the first bearing surface 222 by an intermediate housing spacing 248. The lock nut 128 can include a third step face 250 axially intermediate the first and second step faces 234, 236, and in adjacent facing relation to the third bearing surface 246 for cooperating with the first and second step faces 234, 236 to transfer the axial clamp load from the nut 128 to the platen 114.

In the example illustrated, the third step face 250 is spaced axially apart from the third bearing surface 246 (for example by an intermediate stretch gap 252) when the nut 128 is unloaded, and the third step face 250 abuts the third bearing surface 246 when the axial clamp load is applied to the nut 128. In the example illustrated, the intermediate step face 250 is axially spaced apart from the first step face 234 by a second (intermediate) nut spacing 254. The intermediate nut spacing 254 is less than the intermediate housing spacing 248 when the nut 128 is unloaded, the difference between the intermediate housing spacing 248 and the intermediate nut spacing 254 being equal to the intermediate stretch gap 252.

The intermediate stretch gap 252 is, in the example illustrated, less than the proximal stretch gap 242. In use, upon initial application of pressurized fluid in the clamping chamber, the tie bar 120 is urged towards the right (in FIG. 5), urging the lock nut 128 (through inter-engagement of the teeth 130, 132) also towards the right. Some of the clamp load is immediately transferred to the platen 114 from the nut 128 through the abutment of the first step face 234 against the first bearing surface 222. As the clamp load increases, the tie bar stretches, resulting in maximum rightward displacement of the right-most end of the tie bar, and zero displacement at the left-most end of the tie bar 120. Along the axial extent of the tie bar 120 that is within the bore of the lock nut 128, the same is true (more axial displacement of the tie bar at the right or proximal end than at the left or distal end). The proximal and intermediate stretch gaps can allow the lock nut 128 to stretch axially with the tie bar, so that once full clamping pressure is reached, the load is distributed across the bearing surfaces 222, 246, and 224. The loading on the teeth 130, 132 can also be uniformly distributed across the axial extent of the lock nut 128 by accommodating tie bar stretch through the provision of the plural bearing surfaces 222, 224, 246 and the stretch gaps 242, 252.

Without provision for stretch gaps as disclosed above, the stepped lock nut 128 can still provide enhanced force distribution across the axial extent of the nut and the engaged teeth 130, 132. However, with the provision of the stretch gaps, the lock nut can stretch with the tie bar, and the stress on the tie bar and lock nut can be distributed more broadly and more uniformly. Without the steps and/or without the stretch gaps, the stress would generally be more concentrated in a localized axial position, typically near the front (proximal) end of the nut. More localized, concentrated stress loading can reduce the overall machine clamp capacity and/or reduce the service life of the locking device components, including the tie bar in some cases.

A generally sealed lubrication chamber 260 can be provided between at least a substantial portion of the radially outer surface of the locking nut 128 and the inner surface of the housing 129. Lubrication fluid can be provided in the lubrication chamber 260 to further facilitate rotation of the locking nut 128 between the locked and unlocked positions. A proximal seal 262 (e.g. a radial shaft seal) can be provided between the outer surface of the nut 128 and the housing 129 at a proximal end of the nut to seal off the proximal end of the chamber 260. A distal seal 264 can be provided at the distal end of the locking nut 128 to seal off the chamber 260 at the distal end. The distal seal 264, in the example illustrated, comprises a radially outer seal 266 (mounted between the housing 129 and the retainer 238) and a radially inner seal 268 (mounted between the nut 128 and the retainer 238). A valved fill port 270 can extend between the two seals 266, 268 for filling the chamber 260. A drain port 271 can similarly be provided, at a lower point around the circumference of the chamber 260.

In the example illustrated, the lubrication fluid can be unpressurized, i.e. maintained at generally atmospheric pressure, since the locking device 126 is free of (or isolated from) any pressure chambers for generating a clamping force or an unclamp force. This can reduce the pressure rating requirements for the seals 262, 264 which can permit use of lower friction seals, which in turn can further reduce the time and energy required to move the locking device 126 between the locked and unlocked positions.

Referring again to FIG. 2, the traverse actuator 124 can be free of provisions for providing an unclamp force (or mold break force) after an injection cycle. Such provisions can be understood with reference to a prior art injection molding machine, wherein the traverse actuator(s) provide an unclamp force of at least about 5% to 10% of the clamp force, and the traverse actuator(s) are arranged so that this force is generally equally balanced about the vertical and horizontal center point of the platen (e.g. a single actuator located generally centrally of the mold, or plural actuators arranged symmetrically about the center point).

In the example illustrated, the clamp mechanism of the injection molding machine provides the unclamp force to separate the platens after an injection cycle. The traverse actuator of the injection molding machine can be sized with a significantly lower maximum force rating than would otherwise be required if it were to provide an unclamp force. In the example illustrated, the maximum force rating of the traverse actuator in the mold open direction is about 3% of the maximum clamp force of the machine. In other examples, the traverse actuator may be only 1% (or less) of the maximum clamp force of the machine. Furthermore, the traverse actuator may alternatively or additionally be arranged to exert its opening and closing force at a point that is laterally offset with respect to the center of the moving platen 114. In the example illustrated, a single traverse actuator is mounted at or near the lower end of the moving platen. This can provide additional space and flexibility with respect to overall packaging of components in the injection molding machine 110.

Figure 12:
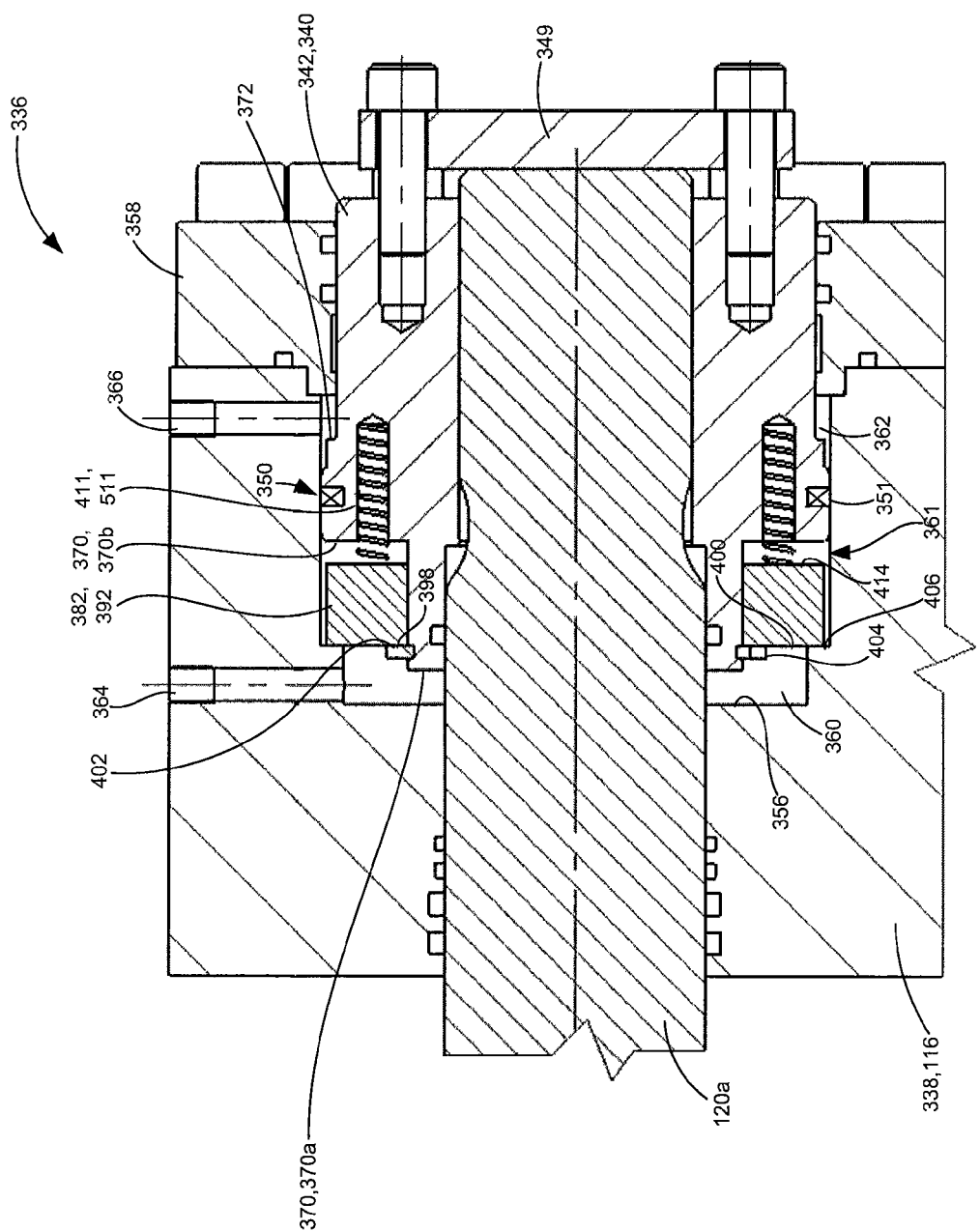
FIG. 12 is a cross-sectional view similar to that of FIG. 7 showing an alternate example of a clamp mechanism.

Referring to FIG. 12, an alternative example of a clamping mechanism 336 is shown. The clamping mechanism 336 is similar to the clamping mechanism 136, with like features identified by like reference characters, incremented by 200.

The clamping mechanism 336 comprises a pushing member 411 for exerting a positioning force on the positioning member 382 to move and/or releasably retain the positioning member 382 to/in the advanced position. In the example illustrated, the positioning force is generated by springs 511 acting between the distal end face 414 of the positioning member 382 and the piston 140, urging the positioning member away from the clamping side 361 of the seal journal 350.

In use, the piston 340 is moved to the datum position by relieving pressure in the clamp chamber 360 (e.g. venting port 364 to tank in the example illustrated). The springs 511 can move the positioning member to the advanced position relative to the piston (i.e. with the first contact surface 398 bearing against the first abutment surface 402 of the retainer 404. The unclamp chamber 362 is pressurized so that it exerts a datum force on the piston 340 that is less than the positioning force exerted by the springs 511. Accordingly, the positioning member 382 is retained in the advanced position relative to the piston by the springs 511. The pressure of the clamp chamber moves the piston into position so that the second (radially outer) contact surface 400 of the positioning member 382 remains engaged with the second abutment surface 406 of the cylinder housing.

During clamping of the platens, the unclamp chamber can be depressurized, and the clamp chamber pressurized. The pressure in the clamp chamber exerts a force on the piston to move the piston towards the clamped position. The springs may or may not compress during the clamping of the platens. Pressurized fluid in the clamping chamber can bear directly against the end face of the piston and/or the clamping shoulder of the piston (face 370b). Fluid may flow around or through the positioning member (e.g. through apertures in the positioning member) to access the clamping shoulder from the clamping port 364. For certain applications, particular for long running, low-cycle time applications, the machine can be set up so that the total axial travel of the piston from the datum position to full clamping of the platens can be minimized, and can be as short as a few millimeters or less.

During unclamp (mold break), the clamping chamber 360 can be depressurized (port 364 vented to tank), and the unclamp chamber 362 pressurized (high pressure fluid fed through port 366). The axial force generated by the pressurized unclamp chamber 362 can be greater than the force exerted by the springs 511, so that the springs can compress, allowing the positioning member 382 to be displaced towards the retracted position relative to the piston 340. The ability of the piston 340 to move in an unclamp direction (i.e. left in FIG. 12) past its axial position upon initiating clamp-up (i.e. past the datum position) can help to ensure that sufficient unclamp stroke length is available to separate and relieve the pressure on the clamped mold halves 314a, 316a. This unclamp stroke length is available even in cases where the piston travel from datum to fully clamped platens is minimal, and/or in cases where the mold has flashed.

When the clamp piston is pre-positioned to the datum position before applying the mold clamp force, it can be advantageous to ensure that the clamp chamber side of the piston is in communication with a supply of oil that can rapidly deliver enough oil to the clamp chamber to ensure the clamp chamber remains filled with oil. For example, as mentioned hereinabove with respect to FIGS. 1a to 1c, pre-positioning the clamp piston 40 can include providing a positioning gap 77 between the portions 14a, 16a of the mold after the moving platen 14 is locked to the tie bars 20. The moving platen 14 may then be advanced to substantially close the positioning gap 77, causing a simultaneous advancement of the clamp piston 40 away from the unclamped position (via movement of the tie bars 20).

Closing the positioning gap 77 can be accomplished by energizing the traverse actuator 24, by pressurizing the clamp chamber 60 with oil, or a combination of both. For example, if a majority of the force required to move the moving platen 14 is provided by urging fluid into the clamp chamber, then a relatively high volume of relatively low pressure oil can facilitate rapidly filling the clamp chamber to close the gap 77. The relatively low pressure can be, for example, a pressure that is 5 percent or less than the pressure of the fluid in the clamp chamber for applying the mold clamp force during an injection cycle. As well, the traverse actuator 24 can be energized slightly to, for example, eliminate drag that the traverse actuator 24 could otherwise cause if attempting to force advancement of the traverse actuator without it being energized. Alternately, if the majority of the force required to move the moving platen 14 is provided by energizing the traverse actuator 24, then a relatively high volume of relatively low pressure fluid can help to simultaneously fill the clamp chamber 60 with oil to minimize or eliminate generating a vacuum (or suction) in the clamp chamber 60. In some examples, a prefill fluid source can be provided in communication with the clamp chamber to provide a relatively high volume of relatively low pressure fluid for filling the clamp chamber 60 during pre-positioning of the clamp piston 40.

Figure 13:
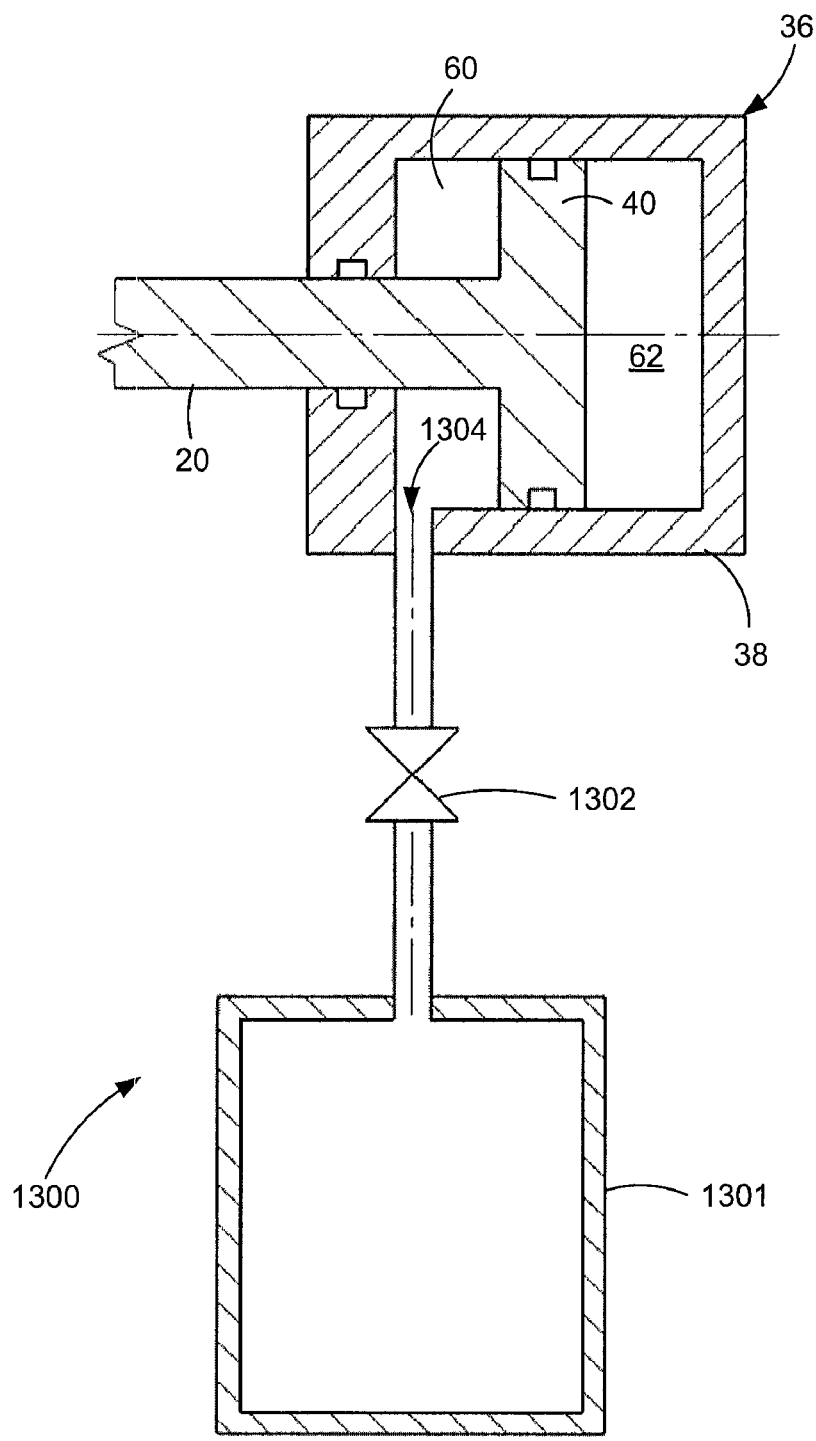
FIG. 13 is a schematic illustration of one example of a prefill circuit for pre-filling a clamp chamber before applying a mold clamp force.

Referring to FIG. 13, one example of a prefill fluid source 1300 comprises an accumulator 1301. The accumulator 1301 may be provided in fluid communication with the clamp chamber 60 by a valve 1302 and a port 1304. Fluid may be housed in the accumulator 1301, and the fluid may be released into the clamp chamber 60 by opening the valve 1302. The pressure of the fluid in the accumulator 1301 is only a fraction of the pressure supplied to the clamp chamber 60 during mold clamp. In the example illustrated, the pressure of the prefill fluid source (i.e. pressure of the oil in the accumulator 1301) is between about 0.5 percent and about 2 percent of the pressure supplied to the clamp chamber for exerting the mold clamp force Referring to FIG. 14, an alternate example of a prefill fluid source 1400 comprises a prefill piston 1402 within a prefill cylinder housing 1404. The prefill piston 1402 and prefill cylinder housing 1404 may cooperate to provide a first prefill volume 1406 on a first axial side of the prefill piston 1402, and a second prefill volume 1408 on a second axial side of the prefill piston 1402. The first prefill volume 1406 may be in communication with the clamp chamber 60 via a conduit 1410, and a feed line 1411 extending between the conduit 1410 and a clamp chamber port 1412. The second prefill volume 1408 may be in communication with a pressure source via port 1414.

A prefill valve 1416 may be provided between the first prefill volume 1406 and the clamp chamber 60, in line with the conduit 1410 and between the first prefill volume 1406 and the feed line 1411. The prefill valve 1416 may comprise a valve piston 1418 within a valve cylinder housing 1420, and a valve stopper 1422 connected to the valve piston 1418. The valve piston 1418 and the valve cylinder housing 1420 may cooperate to provide a valve open chamber 1424, and a valve closed chamber 1426 on axially opposite sides of the valve piston 1418. A valve open port 1428 may be provided in communication with the valve open chamber 1424, and a valve closed port 1430 may be provided in communication with the valve closed chamber 1426.

To rapidly fill the clamp chamber 60, the prefill valve 1416 may be opened by injecting fluid into the valve open chamber 1424 via the valve open port 1428, and venting the valve closed chamber 1426 to tank via the valve closed port 1430. This urges the valve piston 1418 and the valve stopper 1422 to an advanced position (i.e. towards the right in FIG. 14). In the advanced position, the stopper 1422 does not occlude the conduit 1410, and the prefill valve 1416 is open.

The second prefill volume 1408 may be pressurized (fed with pressurized oil via port 1414) to urge the prefill piston 1402 towards an advanced position, thereby reducing the volume of the first prefill chamber 1406 and displacing fluid from the first prefill volume 1406 towards the clamp chamber 60. The second prefill volume can be sized substantially smaller, and having a significantly smaller effective surface area, than that of the first prefill volume, so that a relatively small amount of feed oil (fed through port 1414) results in displacement of a much greater volume of oil from the first prefill volume and into the clamp chamber 60.

After the moving platen 14 is moved to the advanced position (i.e. after the gap 77 is closed and the clamp piston is in the datum position), the prefill valve 1406 may be closed. For example, the valve open chamber 1424 may be vented to tank via the valve open port 1428, and the valve closed chamber 1426 may be pressurized by injecting fluid into the valve closed chamber 1426 via the valve closed port 1430. This urges the valve piston 1418 and the valve stopper 1422 to a retracted position (i.e. to the left in FIG. 14). In the retraced position, the stopper occludes the conduit 1410, and the prefill valve 1416 is closed.

The clamp chamber 60 may then be pressurized with high pressure oil so as to exert a clamping force urging the portions of the mold together, as described hereinabove. The high pressure clamp oil can be fed into the clamp chamber 60 via a directional control valve 1434 in line with the conduit 1410. The directional control valve 1434 can be spaced apart from the prefill valve 1416 so that the feed line 1411 connects to the conduit 1410 at a point between the prefill valve 1416 and the directional control valve 1434. When pressurizing the clamp chamber 60 with the high pressure clamp oil (to exert the mold clamp force), the high pressure in the conduit 1410 exerts a force on the stopper 1422 that further urges the stopper 1422 to its seated, closed position. This can help to avoid leakage through the prefill valve 1416 during mold clamp.

When the injection cycle is complete, at least a portion of the oil in the clamp chamber 60 (and the feed line 1411 and conduit 1410) can be directed back towards the first prefill volume 1406. The prefill valve 1416 can be opened to provide fluid communication between the clamp chamber 60 and the first prefill volume 1406. This can "recharge" the first prefill volume so that the relatively high volume of relatively low pressure oil is ready for the next cycle. The directional control valve 1434 can be opened to ensure that desired volume and pressure of oil are replenished in the first prefill volume 1406.

Figure 14:
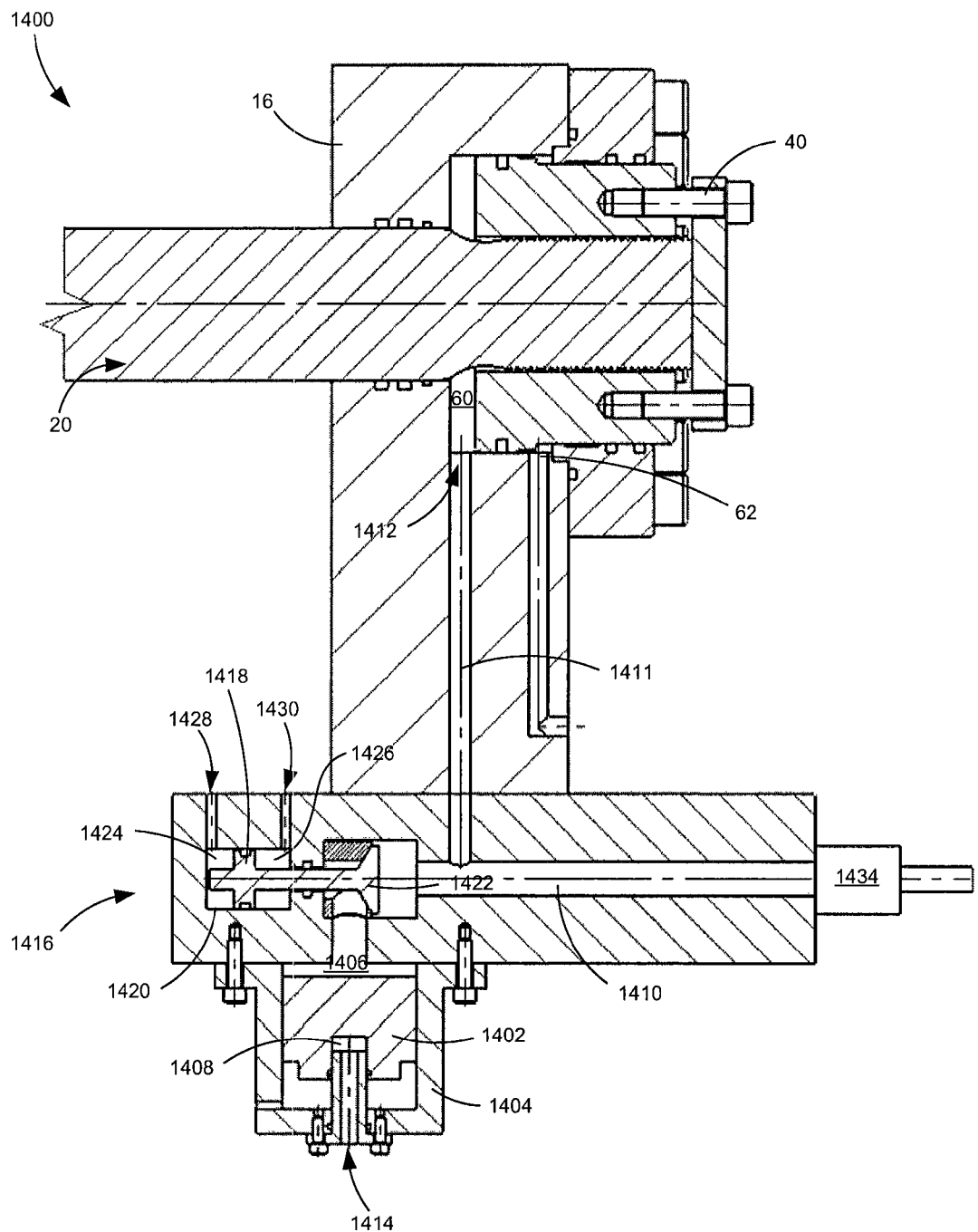
FIG. 14 is a schematic illustration of another example of a prefill circuit for pre-filling a clamp chamber before applying a mold clamp force.

The examples described with respect to FIGS. 13 and 14 may be combined with any of the examples described with respect to FIGS. 1 to 12.

While the above description provides examples of one or more processes or apparatuses, it will be appreciated that other processes or apparatuses may be within the scope of the accompanying claims.

The invention claimed is:

1. A method for injection molding, comprising:
a) energizing a traverse actuator in a first direction to advance a moving platen towards a closed position relative to a stationary platen, the moving and stationary platens carrying respective portions of a mold, and leaving a positioning gap between the portions of the mold;
b) after step a), locking a first one of the moving and stationary platens to a tie bar extending from the other, second one, of the moving and stationary platens;
c) after step b) pre-positioning a clamp piston within a cylinder housing to a datum position axially intermediate a clamping position and an unclamped position, wherein the clamp piston is prepositioned by energizing the traverse actuator in the first direction and further advancing the moving platen to substantially close the positioning gap, the clamp piston affixed to the tie bar and the cylinder housing affixed to the second one of the moving and stationary platens, the clamp piston and cylinder housing cooperating to provide a clamp chamber and an unclamp chamber in the cylinder housing on axially opposite sides of the piston for urging the clamp piston towards the clamping and unclamped positions, respectively, when pressurized;
d) after steps c) and b), pressurizing the clamp chamber so as to exert a clamping force urging the portions of the mold together;
e) after step d), injecting melt into the mold portions;
f) after step e), relieving pressure in the clamp chamber;
g) after step f), pressurizing the unclamp chamber to move the piston toward the unclamped position;
h) after step f), unlocking the first one of the moving and stationary platens from the tie bar; and
i) after step h), energizing the traverse actuator to retract the moving platen to an open position spaced away from the stationary platen.

2. The method of claim 1, wherein step h) is performed after step g), and wherein step g) comprises applying a mold break force for urging the mold portions apart.

3. The method of claim 2, further comprising moving the piston to a shutter position before step b), and step c) comprises moving the piston axially away from the shutter position after step b).

4. The method of claim 1, wherein step c) comprises, prior to step b), moving a stop member to an advanced position in the cylinder housing, and urging the clamp piston to bear against the stop member.

5. The method of claim 4, wherein step c) comprises pressurizing the unclamp chamber.

6. The method of claim 4, wherein step c) comprises venting the clamp chamber to tank.

7. The method of claim 4, wherein step c) comprises pressurizing a positioning chamber in communication with the stop member for urging the stop member to the advanced position.

8. The method of claim 4, wherein the stop member is movably disposed between the clamp chamber and the piston, and wherein moving the stop member from a retracted position to the advanced position reduces the volume of the clamp chamber.

9. The method of claim 4, wherein step b) comprises rotating a lock nut to engage teeth provided on the tie bar.

10. The method of claim 1, wherein step b) comprises locking the moving platen to the tie bar.

11. The method of claim 1, wherein the traverse actuator comprises a ball screw.

12. The method of claim 11, wherein the traverse actuator further comprises an encoder for reading the axial position of the moving platen.

13. The method of claim 1, wherein step c) further comprises rapidly filling the clamp chamber with relatively high volume, low pressure fluid as the piston moves from the clamping position to the datum position, and wherein step d) further comprises pressurizing the clamp chamber with relatively low volume, high pressure fluid when the piston moves from the datum position to the clamping position.

14. A clamping mechanism for an injection molding machine, comprising:
a) a cylinder housing affixed to a platen;
b) a piston affixed to a tie bar, the piston slidable within the cylinder housing among a clamped, an unclamped, and a datum position, the clamped, unclamped, and datum positions being axially spaced apart from each other;
c) a clamp chamber in the housing on a first side of the piston for urging the piston to the clamped position when pressurized;
d) an unclamp chamber on a second side of the piston axially opposite the first side for urging the piston towards the unclamped position when pressurized;
e) a prefill fluid source in communication with the clamp chamber for filling the clamp chamber when the piston is moved from the unclamped position to the datum position; and
f) a high pressure clamping fluid source in communication with the clamp chamber for pressurizing the clamp chamber when the piston is moved from the datum position to the clamped position.

15. The clamping mechanism of claim 14, wherein the prefill fluid source comprises an accumulator.

16. The clamping mechanism of claim 14, wherein the prefill fluid source comprises a prefill piston within a prefill cylinder housing, the prefill piston and prefill cylinder housing cooperating to provide a first prefill volume on a first axial side of the prefill piston, and a second prefill volume is on a second axial side of the prefill piston, wherein when the second prefill volume is pressurized, the prefill piston is urged towards an advanced position to urge fluid from the first prefill volume into the clamp chamber.

17. The clamping mechanism of claim 16, further comprising a prefill valve provided between the prefill fluid source and the clamp chamber.

18. The clamping mechanism of claim 17, wherein the prefill valve comprises a valve piston within a valve cylinder housing, and a valve stopper mounted to the valve piston, the valve piston and valve cylinder housing cooperating to provide a valve open chamber and a valve closed chamber in the cylinder housing on axially opposite sides of the valve piston.

19. The clamping mechanism of claim 18, wherein when the valve open chamber is pressurized and the valve closed chamber is vented, the valve piston and valve stopper are urged to an advanced position, wherein when the valve stopper is in the advanced position, the prefill valve is open.

* * * * *